United States Patent
Halepovic et al.

(10) Patent No.: US 11,563,539 B2
(45) Date of Patent: *Jan. 24, 2023

(54) AGILE TRANSPORT FOR BACKGROUND TRAFFIC IN CELLULAR NETWORKS

(71) Applicants: AT&T Intellectual Property I, L.P., Atlanta, GA (US); The Board of Trustees of the University of Illinois, Urbana, IL (US)

(72) Inventors: Emir Halepovic, Somerset, NJ (US); Vijay Gopalakrishnan, Edison, NJ (US); Hulya Seferoglu, Chicago, IL (US); Muhammad Usama Chaudhry, Milpitas, CA (US); Shibin Mathew, Chicago, IL (US); Shanyu Zhou, Chicago, IL (US); Balajee Vamanan, Chicago, IL (US)

(73) Assignees: AT&T Intellectual Property I, L.P., Atlanta, GA (US); The Board of Trustees of the University of Illinois, Urbana, IL (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/101,015

(22) Filed: Nov. 23, 2020

(65) Prior Publication Data
US 2021/0258117 A1 Aug. 19, 2021

Related U.S. Application Data

(63) Continuation of application No. 16/385,782, filed on Apr. 16, 2019, now Pat. No. 10,848,284.

(51) Int. Cl.
*H04L 5/00* (2006.01)
*H04W 72/08* (2009.01)
*H04L 67/56* (2022.01)

(52) U.S. Cl.
CPC .......... *H04L 5/0048* (2013.01); *H04L 67/56* (2022.05); *H04W 72/08* (2013.01)

(58) Field of Classification Search
CPC ..... H04L 5/0048; H04L 67/56; H04L 47/822; H04L 5/0055; H04W 72/08; H04W 28/0284
See application file for complete search history.

(56) References Cited

U.S. PATENT DOCUMENTS 6,069,871 A 5/2000 Sharma et al.
6,311,056 B1 10/2001 Sandidge
(Continued)

FOREIGN PATENT DOCUMENTS

GB 2315386 1/1998

OTHER PUBLICATIONS

Olvera-Irigoyen et al., Available Bandwidth Probing for Path Selection in Heterogeneous Home Networks, Dec. 7, 2012 (Year: 2012).*
(Continued)

*Primary Examiner* — Tejis Daya
(74) *Attorney, Agent, or Firm* — Hartman & Citrin LLC

(57) ABSTRACT

Concepts and technologies directed to agile transport for background traffic in cellular networks are disclosed herein. In various aspects, a system can include a processor and memory storing instructions that, upon execution, cause performance of operations. The operations can include determining a capacity of a communication path that communicatively couples a user equipment to a radio access network cell site. The operations can include identifying, from the radio access network cell site, a queue that is constructed for the user equipment. The operations can include assembling a plurality of probe burst packet sets from a background traffic flow. The operations can include probing the communication path for spare capacity using the plurality of probe burst packet sets and delivering the background traffic flow to the user equipment using the spare capacity while the communication path is not busy.

20 Claims, 12 Drawing Sheets

(56) References Cited

U.S. PATENT DOCUMENTS

| | | | |
|---|---|---|---|
| 7,516,238 | B2 | 4/2009 | Key et al. |
| 7,609,661 | B2 | 10/2009 | Chae et al. |
| 8,340,099 | B2 | 12/2012 | Black et al. |
| 9,444,569 | B2 | 9/2016 | Vannithamby et al. |
| 9,503,384 | B1* | 11/2016 | Oliveira .............. H04L 43/0882 |
| 10,122,607 | B2 | 11/2018 | Luna |
| 2006/0164986 | A1* | 7/2006 | Rinne ..................... H04L 69/16 370/231 |
| 2007/0230352 | A1* | 10/2007 | Kokku .................... H04L 45/00 370/238 |
| 2014/0321273 | A1* | 10/2014 | Morrill .............. H04L 12/6418 370/230 |
| 2017/0099613 | A1 | 4/2017 | Berggren et al. |
| 2018/0067765 | A1 | 3/2018 | Ra et al. |

OTHER PUBLICATIONS

Kuzmanovic et al., "TCP-LP: Low-Priority Service via End-Point Congestion Control," IEEE/ACM Transactions on Networking (TON), Aug. 2006, vol. 14, Issue 4, pp. 739-752, http://www.cs.northwestern.edu/~akuzma/doc/TCP-LP-ToN.pdf.

Rossi et al., "LEDBAT: The New BitTorrent Congestion Control Protocol," 2010 Proceedings of the 19$^{th}$ International Conference on Computer Communications and Networks, Aug. 2-5, 2010, https://www.researchgate.net/publication/224170739_LEDBAT_The_new_bittorrent_congestion_control_protocol.

Carofiglio et al., "A hands-on Assessment of Transport Protocols with Lower than Best Effort Priority," 35$^{th}$ IEEE Conference on Local Computer Networks (LCN '10), Oct. 11-14, 2010, https://perso.telecom-paristech.fr/gagnaire/Workshop-Papers/paper-6.pdf.

Winstein et al., "Stochastic Forecasts Achieve High Throughput and Low Delay over Cellular Networks," Proceedings of the 10th USENIX Symposium on Networked Systems Design and Implementation (NSDI '13), Apr. 2-5, 2013, https://www.usenix.org/system/files/conference/nsdi13/nsdi13-final113.pdf.

Kouvatsos, Demetres, "Mobility Management and Quality-of-service for Heterogeneous Networks," published Apr. 14, 2009, River Publishers Series in Information Science and Technology, pp. 418-420 (Year: 2009).

U.S. Office Action dated Apr. 6, 2020 in U.S. Appl. No. 16/385,782.

U.S. Notice of Allowance dated Aug. 6, 2020 in U.S. Appl. No. 16/385,782.

\* cited by examiner

AGILE TRANSPORT FOR BACKGROUND TRAFFIC IN CELLULAR NETWORKS

CROSS-REFERENCE TO RELATED APPLICATIONS

This application is a continuation of and claims priority to U.S. patent application Ser. No. 16/385,782, entitled "Agile Transport for Background Traffic in Cellular Networks," filed Apr. 16, 2019, now U.S. Pat. No. 10,848,284, which is incorporated herein by reference in its entirety.

STATEMENT REGARDING FEDERALLY SPONSORED RESEARCH OR DEVELOPMENT

This invention was made with government support under contract number W911NF-18-2-0181 awarded by the US Army Research Laboratory and grant number 1801708 awarded by the National Science Foundation. The government has certain rights in this invention.

BACKGROUND

Cellular networks have become successful due to their superior geographical coverage and their better support for mobility than wired networks and local wireless (e.g., Wi-Fi) networks. It is possible that in the coming years, users may access networks primarily through cellular and wireless traffic connections instead of wired traffic connections. The growth in cellular traffic may be driven by applications that rely on network services and/or an increase in the number of wireless-capable devices, such as mobile communication devices, Internet of Things ("IoT") devices, connected vehicles, or the like. Although cellular networks have historically been able to provide enough capacity for data transfer, the amount of cellular data traffic is growing at a rate which may exceed historical capacity limits. Existing transport protocols for background traffic were designed specifically for wired networks and local wireless (e.g., Wi-Fi) networks. As such, many transport protocols that are implemented in cellular networks can lead to network resource inefficiencies, saturation of cellular links, and severe degradation of the throughput for users and applications.

SUMMARY

The present disclosure is directed to agile transport of background traffic flows in cellular networks, according to various embodiments. According to one aspect of the concepts and technologies disclosed herein, a system is disclosed. In some embodiments, the system can be implemented by a proxy server. In some embodiments, the system can include a processor and a memory. The memory can store computer-executable instructions that, when executed by the processor, cause the processor to perform operations. The operations can include determining a capacity of a communication path that communicatively couples a user equipment to the radio access network cell site. In some embodiments, the operations can identify, from the radio access network cell site, a queue that is constructed for the user equipment. In some embodiments, the queue can be provided by the radio access network cell site, where the queue is specifically dedicated for use by the user equipment and not shared with another user equipment. The operations can include assembling a plurality of probe burst packet sets from a background traffic flow. The operations can include probing the communication path for spare capacity using the plurality of probe burst packet sets. In some embodiments, the spare capacity can correspond with a difference that is detected between the capacity, which can provide a maximum sending rate, and an instantaneous sending rate from the radio access network cell site to the user equipment. The operations can include delivering the background traffic flow to the user equipment using the spare capacity while the communication path is not busy. In some embodiments, delivery of the background traffic flow using the spare capacity can occur via the communication path while a foreground traffic flow is being delivered concurrently via the communication path. In some embodiments, the delivery of the background traffic flow is limited such that a reserve capacity of the communication path is maintained. In some embodiments, the plurality of probe burst packet sets comprises a first probe burst packet set, a second probe burst packet set, and a third probe burst packet set. In some embodiments, the third probe burst packet set can be larger in size than the second probe burst packet set, and the second probe burst packet set can be larger in size than the first probe burst packet set.

In some embodiments, probing the communication path for spare capacity using the plurality of probe burst packet sets can include implementation of one or more operations. The operations may include delivering, via the communication path, the first probe burst packet set to the user equipment. The operations may include determining that the communication path is not busy based on a lack of a packet inter-arrival discontinuity after delivery of the first probe burst packet set. In response to determining that the communication path is not busy, the operations can include delivering, via the communication path, the second probe burst packet set to the user equipment. The operations can include determining that the communication path remains not busy based on a lack of a packet inter-arrival discontinuity after delivery of the second probe burst packet set. In response to determining that the communication path remains not busy, the operations can include delivering, via the communication path, the third probe burst packet set to the user equipment. The operations can include determining that the communication path continues to remain not busy based on a lack of a packet inter-arrival discontinuity after delivery of the third probe burst packet set. In some embodiments, delivering the background traffic flow to the user equipment can occur in response to determining that the communication path continues to remain not busy.

In some embodiments, the operations can include detecting whether bursts of a foreground traffic flow are being sent concurrently along the communication path while the background traffic flow is being delivered. In response to detecting that bursts of the foreground traffic flow are being sent, the operations may include determining whether the communication path is busy. In response to determining that the communication path is busy, the operations may include yielding the capacity of the communication path to the foreground traffic flow.

According to another aspect of the concepts and technologies disclosed herein, a method is disclosed, according to an embodiment. The method can include determining, by a proxy server, a capacity of a communication path that communicatively couples a user equipment to a radio access network cell site. In some embodiments, the method can include identifying, by the proxy server, from the radio access network cell site, a queue that is constructed for the user equipment. The method can include assembling, by the proxy server, a plurality of probe burst packet sets from a background traffic flow. The method can include probing, by the proxy server, the communication path for spare capacity using the plurality of probe burst packet sets. The method can include delivering, by the proxy server, the background traffic flow to the user equipment using the spare capacity while the communication path is not busy. In some embodiments, delivery of the background traffic flow is limited such that a reserve capacity of the communication path is maintained. In some embodiments, the plurality of probe burst packet sets can include a first probe burst packet set, a second probe burst packet set, and a third probe burst packet set. In some embodiments, the third probe burst packet set can be larger in size than the second probe burst packet set, and the second probe burst packet set can be larger in size than the first probe burst packet set.

In some embodiments, probing the communication path for spare capacity using the plurality of probe burst packet sets can include one or more operations. For example, the method can include delivering, by the proxy server, via the communication path, the first probe burst packet set to the user equipment, and determining, by the proxy server, that the communication path is not busy based on a lack of a packet inter-arrival discontinuity after delivery of the first probe burst packet set. In response to determining that the communication path is not busy, the method can include delivering, by the proxy server, via the communication path, the second probe burst packet set to the user equipment. The method can include determining, by the proxy server, that the communication path remains not busy based on a lack of a packet inter-arrival discontinuity after delivery of the second probe burst packet set. In response to determining that the communication path remains not busy, the method can include delivering, by the proxy server, via the communication path, the third probe burst packet set to the user equipment. The method can include determining, by the proxy server, that the communication path continues to remain not busy based on a lack of a packet inter-arrival discontinuity after delivery of the third probe burst packet set. In some embodiments, delivering the background traffic flow to the user equipment can occur in response to determining that the communication path continues to remain not busy. In some embodiments, the method can include detecting, by the proxy server, whether bursts of a foreground traffic flow are being sent concurrently along the communication path while the background traffic flow is being delivered. In response to detecting that bursts of the foreground traffic flow are being sent, the method can include determining, by the proxy server, whether the communication path is busy. In response to determining that the communication path is busy, the method can include yielding, by the proxy server, the capacity of the communication path to the foreground traffic flow.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system, such as a proxy server. The operations can include determining a capacity of a communication path that communicatively couples a user equipment to a radio access network cell site. In some embodiments, the operations can include identifying, from the radio access network cell site, a queue that is constructed for the user equipment. The operations can include assembling a plurality of probe burst packet sets from a background traffic flow. The operations can include probing the communication path for spare capacity using the plurality of probe burst packet sets. The operations can include delivering the background traffic flow to the user equipment using the spare capacity while the communication path is not busy. In some embodiments, delivery of the background traffic flow can be limited such that a reserve capacity of the communication path is maintained. In some embodiments, the plurality of probe burst packet sets can include a first probe burst packet set, a second probe burst packet set, and a third probe burst packet set. In some embodiments, the third probe burst packet set can be larger in size than the second probe burst packet set, and the second probe burst packet set can be larger in size than the first probe burst packet set.

In some embodiments, probing the communication path for spare capacity using the plurality of probe burst packet sets can include and/or be supplemented by one or more operations. The operations can include delivering, via the communication path, the first probe burst packet set to the user equipment. The operations can include determining that the communication path is not busy based on a lack of a packet inter-arrival discontinuity after delivery of the first probe burst packet set. In response to determining that the communication path is not busy, the operations can include delivering, via the communication path, the second probe burst packet set to the user equipment. The operations can include determining that the communication path remains not busy based on a lack of a packet inter-arrival discontinuity after delivery of the second probe burst packet set. In response to determining that the communication path remains not busy, the operations can include delivering, via the communication path, the third probe burst packet set to the user equipment. The operations can include determining that the communication path continues to remain not busy based on a lack of a packet inter-arrival discontinuity after delivery of the third probe burst packet set. In some embodiments, the operations can include detecting whether bursts of a foreground traffic flow are being sent concurrently along the communication path while the background traffic flow is being delivered. In response to detecting that bursts of the foreground traffic flow are being sent, the operations can include determining whether the communication path is busy. In response to determining that the communication path is busy, the operations can include yielding the capacity of the communication path to the foreground traffic flow.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
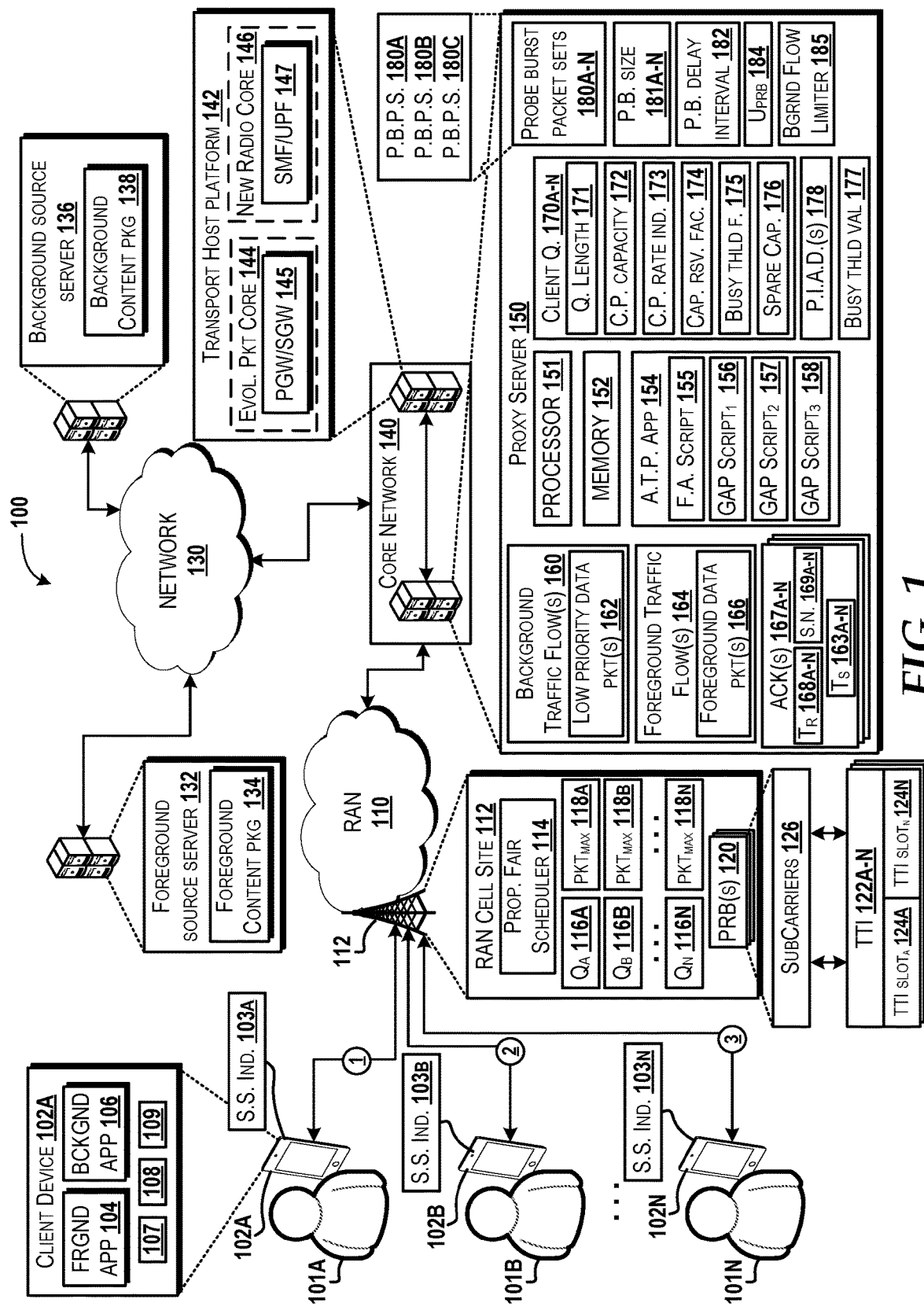
FIG. 1 is a block diagram illustrating an example operating environment in which aspects of agile transport for background traffic in cellular networks can be implemented, according to an illustrative embodiment.

The following detailed description is directed to agile transport of background traffic flows in cellular networks. As the amount of client devices (e.g., user equipment) relying on cellular networks for data transfer increases, cell sites serving such client devices may become more congested. Additionally, the amount of data storage available and/or accessible to each client device has enabled each client device to store and/or execute an increasing number of applications. As such, some user-visible applications may execute or otherwise be available to a user in the foreground of the user device, and thus be considered foreground applications. In contrast, some applications executing on the client device may not necessarily be directly visible to a user, but rather execute or otherwise perform background operations on the client device, and thus may be considered to operate as a background application. Examples of background applications can include, but should not be limited to, a cloud-backup application, a firmware update application, a messaging application, a streaming content service application, or any other application that may operate and execute without relying on a continuous user-visible interface. In some embodiments, background applications may rely on cellular networks to transfer vast amounts of data. In some embodiments, the background applications may be delay-tolerant, meaning the background applications may not necessarily require immediate access to network data to function. As such, both user-facing foreground applications and background applications may increasingly rely on cellular networks for large data transfer with various levels of throughput requirements. Yet large data transfers using conventional transport protocols and conventional systems can lead to saturation of wireless communication paths, degradation of response time, and increased burden on network resource infrastructure, such as burdening processing resources at the cell site. At high loads, the data transfers that pertain to background applications could severely degrade the throughput for all client devices and applications that access a radio access network, irrespective of the applications being foreground or background applications.

Wired networks and local wireless networks (e.g., WiFi networks) may implement transport protocols that do not enforce network objectives, but rather rely solely on end-to-end congestion control schemes to achieve fairness of resource utilization because the wired and local wireless networks do not implement any specific per-user scheduling scheme. Wired networks and local wireless networks predominantly use First-In-First-Out ("FIFO") scheduling because the queues are commonly shared among all or most client devices. Comparatively, cellular networks (which may be referred to herein as radio access networks) may attempt to employ in-network schedulers (e.g., a proportional fair scheduler) that employ per-device (or per-user) queues at cell sites to achieve weighted fairness among client devices so as to increase radio resource utilization relative to wired network and local wireless networks. Wired and local wireless networks typically use conventional protocols (e.g., TCP) as an end-to-end mechanism for achieving fairness because conventional protocols treat all data traffic flows equally. Since conventional transport protocols treat all traffic flows equally, performance degradation may occur on both foreground applications and background applications executing on the client device because all traffic flows for foreground applications and background applications are always in competition with each other to use the same resources. Because background applications may be considered more delay-tolerant in relying on network traffic flows than foreground applications, data packets directed to or otherwise associated with background applications may be referred to as low priority data packets and their corresponding network data streams may be referred to as background traffic flows.

Wired and local wireless networks may implement conventional low-priority transport protocols in an attempt to handle background traffic flows. The conventional low priority transport protocols (e.g., LEDBAT and TCP-LP) were configured to operate in wired and local wireless network environments using the FIFO scheduling, and thus the conventional low priority transport protocols are not designed to handle or otherwise interact with the unique configurations and use of a proportional fair scheduler in cellular networks. As such, conventional low-priority transport protocols operate poorly in cellular networks because they yield inaccurate measurements for handling data, thereby causing decreased resource utilization at the cell site.

Because wired and local wireless networks have all traffic passing through the same bottleneck queue(s), the conventional low priority transport protocols (e.g., LEDBAT and/or TCP-LP) may be acceptable in the context of wired and WiFi networks since they provide the overall congestion level of the shared path as reflected by the delay information of the traffic flow for all devices using the shared path. For example, conventional low priority transport protocols, such as LEDBAT and/or TCP-LP, can be used to infer congestion in wired networks and local wireless network because the queues are shared among some or all client devices. Specifically, the LEDBAT protocol compares one-way packet delay with a target delay to infer congestion, and TCP-LP uses one-way packet delay to detect congestion earlier than TCP, which uses round trip times (RTT). As such, fair-share convergence of network resources may take several iterations of multiple round trips when conventional low priority transport protocols are used, which in the time domain is in the order of at least a few hundred milliseconds.

However, cellular networks use per-device queues at cell sites, and therefore use of conventional low priority transport protocols (e.g., TCP, LEDBAT, TCP-LP, etc.) does not accurately reflect congestion levels in cellular networks. Because cellular networks use per-device queues (as opposed to shared queues), a cell site may implement a proportional fair scheduler to handle the queues for each client device. As such, the proportional fair scheduler can determine which queue to serve based on parameters such as signal strength, signal quality, recent throughput history, or the like. Therefore, unlike wired and local wireless (e.g., WiFi) networks, cellular networks that implement a proportional fair scheduler may be configured to achieve fairness in resource allocation and utilization among client devices within a few transmission time intervals, which in the time domain is within a few milliseconds, thus being far shorter in time than the end-to-end mechanisms of wired and wireless networks. As such, if conventional low-priority transport protocols were to be implemented in a cellular network, the resultant values produced would not accurately reflect congestion of communication paths because the conventional low-priority transport protocols rely solely on one-way delay information and/or the RTT information. Because the one-way delay information and RTT information was generated in the cellular network environment (as opposed to a wired and/or WiFi network environment in which the typical low priority protocols are usually implemented), the delay information and RTT information being produced by the cellular network would necessarily include the effect of other factors in addition to congestion which would not necessarily be present in wired networks and/or local wireless networks. Additionally, the propagation delay in cellular networks can be highly variable, which in turn would further perturb the one-way delay information and the RTT information, thereby compromising the accuracy of delay-based congestion estimation when the conventional low-priority protocols (e.g., LEDBAT and/or TCP-LP) are used in cellular networks. Therefore, the measured one-way delay information and/or the RTT information that is typically relied-upon by conventional low priority protocols does not fully capture the overall congestion of the cell site of the cellular network, and thus offers limited insight into the cell site capacity. Another technical challenge that arises when conventional low-priority transport protocols are used a cellular network is that the proportional fair scheduler used in cellular networks may provide an equal opportunity for low priority traffic flows to compete for the same resources during each transmission time interval, which may interfere with the ability to determine or otherwise estimate congestion. As such, computing resources in the cellular network may be wasted when conventional transport protocols and/or conventional low-priority transport protocols are implemented.

Conventional transport protocols and conventional low priority transport protocols were designed for use in wired networks and local wireless networks, and when implemented in cellular networks, do not provide efficient resource utilization for background traffic flows and do not provide accurate network congestion determinations. Another technical challenge is that a proportional fair scheduler in the cellular network may be agnostic to, and thus can conflict with, network policy objectives associated with the communication service provider, such as a network objective for favoring foreground traffic flows associated with foreground applications on a client device over background traffic flows associated with delay-tolerant background applications. Because proportional fair schedulers may be configured to treat foreground traffic flows and background traffic flows equally at a cell site, the network policy objectives for handling background traffic flows may not be achieved by use of proportional fair schedulers in isolation and/or by implementing conventional transport protocols and conventional low priority transport protocols in cellular networks. Historic attempts to achieve network policy objectives within the cellular network have met technical challenges. For example, some cellular networks may attempt to prioritize foreground traffic over background traffic by exclusively using a quality-of-service (QoS) class identifier ("QCI"). Yet sole reliance on QCI to achieve network policy objectives suffers from several limitations. The use of QCI offers only a handful of service classes, some of which are reserved for operator provided services such as voice and voice-over-LTE. Additionally, QCI alone does not distinguish between user traffic flows, but rather only between client devices and/or radio bearers because, when using QCI at the cell site, all traffic is seen only as internet protocol (IP) packets by the cell site, and thus cannot independently provide dynamic changing of weights based on load. As such, it is hard for conventional network mechanisms and conventional transport protocols to offer the operational flexibility and agility to support network policy objectives.

Therefore, concepts and technologies disclosed herein provide an agile, end-to-end transport protocol, herein after referred to as "Agile Transport Protocol" ("ATP"). In various aspects, implementation of the ATP can achieve network policy objectives by delivering background traffic flows without adversely affecting the time-sensitive, foreground traffic flows in the cellular network. As such, the ATP can favor delivery of foreground traffic flows associated with interactive, time-sensitive, foreground applications over delivery of background traffic flows associated with delay-tolerant, time-insensitive, background applications on client devices when the communication path is busy, while also providing delivery of background traffic flows using only spare capacity when the communication path is not busy. The ATP can enable and instruct a proportional fair scheduler of the cellular network to provide resource fairness at short time intervals, while also instructing the cell site of the cellular network to explicitly yield to foreground traffic flows, instead of exclusively attempting to achieve weighted fairness as the primary objective in each per-device queue. In various embodiments, the ATP may be implemented on one or more systems of the cellular network, such as within a radio access network, a core network, or any other elements associated with a transport layer of the cellular network. In some embodiments, the ATP may be implemented by a proxy server that communicates with one or more cell sites, which can be embodied as a base transceiver station, an eNodeB, a gNodeB, and/or another cellular access point.

In various aspects, the ATP achieves better performance (e.g., lower traffic flow completion times for short flows and higher throughput for long flows) for foreground applications than conventional transport protocols by yielding capacity and resources to foreground traffic flows, and at low loads, the ATP achieves better performance for background applications than existing conventional low priority protocols by effectively utilizing spare capacity in a congestion aware context. In various embodiments, the ATP can enable accurate estimations and determinations of capacity and load in low latency scenarios, such as within less than a few transmission time intervals (which in some embodiments may be less than five milliseconds). The ATP can estimate or otherwise enable determination of capacity and load of per-device communication paths based on packet inter-arrival times, and not based exclusively on RTT information and/or on one-way delay information in the cellular network. The ATP can use the estimated capacity and load of the communication path to enable delivery of delay-tolerant, background traffic flows using spare capacity of the communication path. The ATP may be designated as operating in a "normal mode" when a background traffic flow is being delivered to a client device using the spare capacity of the communication path. During the normal mode, the background traffic flow may, in some embodiments, be delivered concurrent with one or more foreground traffic flows. However, because foreground traffic flows are often variable, unpredictable, and latency-sensitive, the ATP can rate-limit the background traffic flow to use less than all of the determined capacity, thereby maintaining a reserve capacity so as to enable concurrent, bursty foreground traffic flows to be delivered. By implementing the ATP, unanticipated bursts of foreground data packets (that correspond with the foreground traffic flow) can be accommodated quickly, thereby improving performance and operation of the network by decreasing resource saturation and avoiding overload of cell site radio resources.

In various aspects, if the current load of the communication path indicates there exists increased competition for resources (i.e., the communication path is considered to be busy or otherwise congested due to one or more senders attempting to utilize the communication path), the ATP can enter a dormant, gradually aggressive probing ("GAP") mode. The GAP mode can yield resources and capacity to foreground traffic flows and instruct the cell site to wait or otherwise withhold sending of the background traffic flow until the communication path is no longer busy. If an instance of background traffic flow is being delivered in normal mode while congestion is detected, then the ATP may institute an exponential back-off of resource usage such that low priority data packets of the background traffic flow are withheld or otherwise cease to be sent within a defined number of transmission time intervals (e.g., within one or two transmission time intervals, for example) of the congestion being detected. As such, the background traffic flow can rapidly yield to foreground traffic flows. While waiting for busyness to subside, the ATP can assemble multiple instances of probe burst packet sets, where each instance can have a larger burst data size. The probe burst packet set with the smallest data size is sent first, followed by incrementally delivering the remaining probe burst packet sets that are gradually large in data size. After sending an instance of the probe burst packet set, the ATP can detect spare capacity and determine busyness. If the communication path is not busy, the next instance of the probe burst packet set (which is larger than the previous instance that was sent) is delivered to the client device along the communication path. During iterations of the GAP mode, spare capacity can be updated and busyness can be determined. In various embodiments, two or more iterations of sending a probe burst packet set may be implemented during the GAP mode. The delivery of the probe burst packet sets can be gradually more aggressive in their use of spare capacity because delivery of larger probe burst packet sets can enable accurate estimates of capacity and load on the communication path. In various aspects, if busyness is detected during the GAP mode, the ATP may implement a time delay defining how long of a delay should be implemented before detecting busyness and probing for spare capacity is restarted. After at least two iterations of sending probe burst packet sets in the GAP mode and determining that spare capacity is available and the communication path is not busy, the ATP can enable (re)activation of the normal mode to begin, resume, and/or complete delivery of the low priority data packets that are included in the background traffic flow. As such, the ATP can prevent spurious estimates of spare capacity by implementing the GAP mode, thereby improving performance of the cell site by avoiding unintended oscillations between delivery of background traffic flows and foreground traffic flows. In some embodiments, the ATP (or aspects thereof) may be referred to in academic literature by another name, such as for example, "Legilimens" or another moniker. It is understood that the examples provided are for illustration purposes only, and therefore should not be construed as limiting in any way. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for agile transport of background traffic flows in cellular networks will be described, according to an illustrative embodiment. The operating environment 100 shown in FIG. 1 includes instances of a client device, such as client devices 102A-N, a radio access network ("RAN") 110, a communications network ("network") 130, and a core network 140. A detailed description of example elements that are shown in FIG. 1 will be discussed below, in turn. It is understood that the examples provided are for illustration purposes only, and therefore should not be construed as limiting in any way.

As shown in FIG. 1, each of the client devices 102A-N may be associated with one or more user, such as any of users 101A-N, respectively. Each of the users 101A-N may provide input or otherwise interact with one or more of the client devices 102A-N, and thus may participate in providing input to the client devices 102A-N that request, obtain, or otherwise retrieve data via a network, such as one or more of the RAN 110, the core network 140, and/or the network 130. Each of the client devices 102A-N can include one or more instance of a processor, such as processor 107, one or more instance of a memory, such as memory 108, and one or more instance of communications components, such as communications components 109. Further discussion of an example embodiment of the processor 107 and the memory 108 are provided below with respect FIGS. 8 and/or 9. The communications components 109 can include one or more instances of a radio transceiver, antenna, processors, and circuitry to facilitate and support wireless communicative coupling via one or more instances of a wireless communication path, such as any of communication paths 1, 2, and 3. Further discussion of an example embodiment of the communications components 109 is discussed with respect to FIGS. 8 and/or 9.

According to various embodiments, the functionality of a client device, such as any of the client devices 102A-N, may be provided by one or more desktop computers, mobile telephones, smartphones, tablet computers, wearable smart devices, laptop computers, set-top boxes, personal home assistant devices, vehicle computing systems, other mobile computing systems, and the like. It should be understood that the functionality of a client device discussed herein, such as the client devices 102A-N, can be provided by a single device, by two or more similar devices, and/or by two or more dissimilar devices. For purposes of describing the concepts and technologies disclosed herein, the client devices 102A-N are described herein as a user equipment, such as a smartphone. In various embodiments of the present disclosure, the client devices 102A-N are configured so as to engage in wireless communicative coupling with a cellular network, such as the RAN 110 further discussed below. A detailed discussion of a user equipment ("UE") is provided below in FIG. 9 as an example embodiment of the client devices 102A-N. It is understood that the examples provided are for illustration purposes only, and therefore should not be construed as limiting in any way.

In various embodiments, each of the client devices 102A-N can store one or more instances of applications in an instance of the memory 108, such as a foreground application 104 and/or a background application 106. As used herein, the phrase "foreground application" (e.g., the foreground application 104) refers to a computer-readable and executable set of instructions that can be user-facing and may operate or otherwise function primarily based on receiving data from a remote network data source, such as a foreground source server 132 accessible via the network 130, and thus the foreground application 104 is intolerant to delays in data delivery from the remote network data source. For example, the foreground application 104 may provide a user interface and an interactive environment that executes independent of data obtained from a remote source, however, at least a portion of content and/or information presented via the foreground application 104 relies on time-sensitive retrieval and/or reception of data that is obtained from the foreground source server 132, such as data from a foreground content package 134 that can be delivered to one of the client devices 102A-N via wireless communicative coupling with the RAN 110. In various embodiments, the foreground content package 134 can include a plurality of instances of data packets, such as foreground data packets 166. In various embodiments, the foreground data packets 166 associated with the foreground content package 134 can be collected, assembled, grouped, and/or segmented for delivery to one of the client devices 102A-N as a stream of data packets. The stream of data packets that pertain or are otherwise associated with an instance of the foreground application 104 may be referred to herein as an instance of a foreground traffic flow, such as foreground traffic flow 164. Because the foreground application 104 may rely on one or more instances of the foreground data packets 166 of the foreground traffic flow 164 in order to operate properly or otherwise function on one of the client devices 102A-N, the foreground application 104 is considered to be intolerant to delays in data delivery. As such, delivery of the foreground traffic flow 164 associated with the foreground application 104 is considered to be latency sensitive, and thus is designated as having a higher-priority than traffic flows to delay-tolerant applications, such as a background traffic flow 160 associated with the background application 106.

In various embodiments, reference to instances of a "background application," such as the background application 106, refers to a computer-readable and executable set of instructions that may not necessarily be user-facing (but in some embodiments may have aspects which are user-facing) and may operate or otherwise function, at least in part, in a manner that is insensitive to delays in delivery of data from a remote network data source, such as the background source server 136 accessible via the network 130. As such, the background application 106 is tolerant to delays in data delivery from the background source server 136 because the background application 106 does not require immediate delivery of data from the background source server 136. In various embodiments, the background application 106 may not necessarily be user-facing, although this may not necessarily be the case in every embodiment because in some embodiments, aspects of the background application 106 may be user-facing. It is understood that the background application 106 may not necessarily reside on a client device as an independent application, but rather in some embodiments, the background application 106 may be configured as a program module, script, or other set of computer-executable instructions that request, retrieve, obtain, or otherwise receive data from the background source server 136 in such as manner as to be tolerant to delays in data delivery. In various embodiments, the background application 106 may seek, request, retrieve, obtain, or otherwise receive data from the background source server 136, such as a background content package 138. In various embodiments, the background content package 138 can include a plurality of instances of data packets, such as low priority data packets 162. As used herein, the phrase "low priority data packets" refers to data that is associated with a delay-tolerant application on one of the client devices 102A-N, such as the background application 106. In various embodiments, the low priority data packets 162 associated with the background content package 138 can be collected, assembled, grouped, and/or segmented for delivery to one of the client devices 102A-N as a stream of data packets. The stream of data packets that pertain or are otherwise associated with an instance of the background application 106 may be referred to herein as an instance of a background traffic flow, such as background traffic flow 160. In some embodiments, a portion of the background traffic flow 160 may store, reference, or otherwise indicate that the low priority data packets 162 included in the stream are latency insensitive and/or delay tolerant. For example, in some embodiments, a header, a frame, an instance of metadata, a tag, or other identifier associated with the background traffic flow 160 can indicate that the low priority data packets 162 are directed to the background application 106, and thus are latency insensitive and tolerant to delays in delivery. Similarly, in some embodiments, a portion of the foreground traffic flow 164 may store, reference, or otherwise indicate that the foreground data packets 166 included in the stream are latency sensitive and are delay intolerant. For example, in some embodiments, a header, a frame, an instance of metadata, a tag, or other identifier associated with the foreground traffic flow 164 can indicate that the foreground data packets 166 are directed to the foreground application 104, and thus may be latency sensitive and intolerant to delays in delivery.

Each of the client devices 102A-N can provide, support, or otherwise engage in wireless communicative coupling, such as wireless communication with the RAN 110. Wireless communication to and/or from each of the client devices 102A-N can occur via establishment of one or more instances of a wireless communication path, such as communication paths 1, 2, and 3, respectively. For clarity, each of the client devices 102A-N is shown in FIG. 1 as being associated with a single communication path, specifically communication paths 1, 2, and 3, respectively. It is understood that two or more instances of a communication path may be established with a single client device, where each communication path may, in some embodiments, be associated with a different wireless communicative coupling mechanism that links the client devices 102A-N with the RAN 110. For clarity purposes, each of the communication paths 1, 2, and 3, shown in FIG. 1 provides or otherwise facilitates cellular communication between the RAN 110 and one or more of the client devices 102A-N. When an instance of one of the client devices 102A-N is powered-on and able to engage in wireless communicative coupling with the RAN 110, each of the client devices 102A-N may indicate the strength of cellular reception with an instance of a cellular access point of the RAN 110, such as a radio access network cell site ("cell site") 112. In various embodiments, the indication of cellular reception strength may be provided via a signal strength indicator, such as signal strength indicators 103A-N. In some embodiments, information conveyed by an instance of the signal strength indicators 103A-N can be provided to the cell site 112 of the RAN 110. Each of the signal strength indicators 103A-N can be associated with an instance of a communication path, such as the communication paths 1, 2, and 3, respectively.

In various embodiments, the RAN 110 can include one or more instances of a cell site, such as the cell site 112, that facilitates, enables, or otherwise supports wireless communicative coupling with one or more instances of the client devices 102A-N. As used herein, use of the phrase "cell site" and "radio access network cell site," such as the cell site 112, refers to a provider edge access point to a cellular and/or mobile network, such an access point of a radio access network, that supports, maintains, or otherwise facilitates cellular communicative coupling, such as via any of the communication paths 1, 2, and 3. It is understood that, in some embodiments, a "radio access network cell site" may be referred to as a "radio access network access point" or "cell site." In some embodiments, a cell site may be referred to as a cellular access point, a mobile network access point, a RAN edge device, or any other provider edge device that facilitates wireless communicative coupling to a cellular network, such as the RAN 110. In some embodiments, the cell site 112 does not provide or facilitate wired communicative coupling with the client devices 102A-N and/or local area network communicative coupling (e.g., a WiFi connection) with the client devices 102A-N. Instances of the cell site 112 can serve or otherwise support one or more of the client devices 102A-N over a defined geographic range. As such, the strength of the wireless connection between an instance of a user equipment (e.g., the client devices 102A-N) and the cell site 112 may be indicated by the signal strength indicators 103A-N. The cell site 112 can include, but should not be limited to, one or more of a base transceiver station, a femtocell, a microcell, a picocell, an eNodeB, a NodeB, a gNodeB (i.e., an access point that incorporates New Radio access technology, such as 5G technology), a multi-standard metro cell node, and/or any other network nodes or combinations thereof that are capable of providing wireless communicative communication to and/or from the RAN 110. In some embodiments, the cell site 112 may not communicatively couple to a user equipment (e.g., any of the client devices 102A-N) via a WiFi connection and/or a wired connection. It is understood that a radio access network cell site, such as the cell site 112, can be configured to support or otherwise conform to one or more current and/or future wireless communication standards, such as but not limited to 2G, 3G, 4G, LTE, LTE+, LTE-U, 5G, New Radio standards, other future standards, or the like, such as understood by one of ordinary skill in the technology. It is understood that an instance of the cell site 112 can include various computing resources that are understood by one of ordinary skill in the technology. As such, aspects of concepts and technology that can be implemented in, or otherwise support, the cell site 112 are discussed with respect to FIGS. 5, 7, and 8. In various embodiments, the RAN 110 corresponds with a radio access network that is configured as a cellular network, which also may be referred to as a mobile network. As such, in various embodiments, the RAN 110 can include a distributed communication network where the last link is a wireless connection, such as the communication paths 1, 2, and 3 with the cell site 112. As such, the RAN 110 may be distributed over various geographic areas called "cells," where each cell is served by at least one fixed (or mobile) location transceiver, which is illustrated in FIG. 1 as an instance of the cell site 112. It is understood that one, two, or more than two instances of the cell site 112 may be implemented in various embodiments of the RAN 110. It should be understood that the examples provided are for illustration purposes only, and therefore should not be construed as limiting embodiments of the concepts and technologies discussed herein in any way.

In various embodiments, an instance of the cell site 112 can include a proportional fair scheduler, such as proportional fair scheduler ("PFS") 114, that can execute on one or more instances of compute resources and/or a processing unit, such as discussed below with respect to FIGS. 7 and 8. In some embodiments, the PFS 114 may be configured to handle various traffic flows to and/or from the client devices 102A-N for an instance of the cell site 112 for the RAN 110. The PFS 114 may manage or otherwise schedule how and/or when resources of the cell site 112 are allocated, scheduled, and/or implemented for use in delivery of data packets to the client devices 102A-N via a corresponding wireless communication path, such as the communication paths 1, 2, and 3, respectively. The PFS 114 can be configured to receive and respond to instructions and/or commands from other elements of the operating environment 100, such as elements within the core network 140. For example, a proxy server 150 of the core network 140 may request information from the PFS 114 and/or instruct the PFS 114 to conform operations to a specific transport protocol, such as the ATP discussed herein. Further discussion of implementation of the ATP by one or more elements of the operating environment 100 is discussed below.

In various embodiments, for each instance of the cell site 112 of the RAN 110, there are N clients connected to the cell site 112 (e.g., the client devices 102A-N), with a queue being constructed and maintained for each client that is currently connected. For example, as shown in FIG. 1, the cell site 112 may have constructed a separate queue for each of the client devices 102A-N that are currently connected, such as queues 116A-N that correspond with the client devices 102A-N, respectively. As such, the cell site 112 generates and maintains queues on a per-device basis. Therefore, each of queues 116A-N is associated with a communication path for each of the client devices 102A-N. For example, the queues 116A, 116B, and 116N can be associated with the communication paths 1, 2, and 3, respectively, which in turn are associated with the client devices 102A, 102B, and 102N, respectively. Although only three instances of a client device, a communication path, and a queue are illustrated in FIG. 1, it is understood that N number of instances may be possible in various embodiments. As such, the examples provided are for illustration purposes only, and therefore should not be used as limiting in any way.

In various embodiments, the communication paths 1, 2, and 3 can be resources of the cell site 112 that are measured in a time domain and a frequency domain. For example, the communication paths 1, 2, and 3 can support wireless communicative coupling via a frame structure to transport data packets. The time interval of the frame structure may, in some embodiments, be measured in 10 millisecond intervals. In some embodiments, the frame structure may be divided into subframes, where each subframe provides a time transmission interval ("TTI"), such as one of the TTIs 122A-N. In some embodiments, the time period for an instance of a TTI can be 1 millisecond. Thus, in some embodiments, the reference time period for a subframe may be measured by the duration of each TTI (e.g., 1 millisecond). In various embodiments, each subframe includes one or more slots ("TTI slot"), such as TTI slots 124A-N, that may be configured or otherwise employed by the PFS 114 for scheduling of traffic. Each TTI slot provides a possible scheduling unit for the PFS 114 to deliver data packets. In some embodiments, TTI slot aggregation may be permitted by the PFS 114 for scheduling the transmission of data from a particular one of the queues 116A-N. Each TTI slot can be configured, by the PFS 114, in the time domain and the frequency domain. In some embodiments, a slot length (i.e., the time period interval for each TTI slot) can scale according to subcarrier spacing in the frequency domain. Thus, in some embodiments, the total number of TTI slots 124A-N within a single frame structure may vary according to the particular channel bandwidth being employed. As such, in some embodiments, data from a queue can be delivered via a subframe that has one TTI slot, two TTI slots, four TTI slots, eight TTI slots, or the like. In various embodiments, channel bandwidth that is employed by resources of the cell site 112 can be separated into (orthogonal) subcarriers, such as subcarriers 126, in the frequency domain that can be invoked for transmission of data in parallel. In various embodiments, a bundle of subcarriers (e.g., from among the subcarriers 126) allocated to a particular TTI slot may be referred to as a physical resource block ("PRB"), such as the PRB 120. At each TTI slot, such as any of the TTI slots 124A-N, the cell site 112 may assign all or part of available PRBs, such as instances of the PRB 120, to a client device, and thus the corresponding queue and communication path will utilize instances of the PRB 120 for the TTI slots 124A-N that are allocated to the particular one of the client devices 102A-N. In some embodiments, each TTI slot can correspond with a defined number of orthogonal frequency division multiplexing (OFDM) symbols, such as 14 OFDM symbols per TTI slot. An instance of an OFDM symbol can identify an inverse Fast Fourier Transform waveform and guard interval that can mitigate channel delay spread and inter-symbol interference. In some embodiments, the OFDM symbols can be created from one or more of the subcarriers 126. It is understood that the examples provided are for illustration purposes only, and therefore should not be used as limiting in any way.

In some embodiments, the PFS 114 may select which of the client devices 102A-N to service based on which device maximizes the ratio of maximum transmission rate for a given time slot to the average throughput between the cell site 112 and the particular client device. The cell site 112 can allocate all instances of the PRB 120 at a certain TTI slot for the transmission of data packets to the corresponding client device, such as one of the foreground traffic flow 164 and/or the background traffic flow 160 to the client device 102A. However, if the PFS 114 determines that there are not enough data packets at the cell site 112 directed towards the particular client device (e.g., the client device 102A), then instances of the PRB 120 may be shared, and thus other client devices (e.g., the client devices 102B and 102N) may be scheduled for data transmission because those other client devices may have a larger ratio of maximum transmission rate for a given time slot to the average throughput. The cell site 112 can update the average throughput corresponding to a particular communication path of a client device (e.g., average throughput for the communication path 1 associated with the client device 102A and the queue 116A) using an exponential moving average. In some embodiments, the PFS 114 can detect and report the maximum number of data packets that were serviced in each instance of a TTI for a particular queue. For example, a packet maximum identifier, such as any of the packet maximum identifiers 118A-N, can indicate the maximum number of data packets that are serviced by the PFS 114 for a particular instance of a TTI (e.g., any of the TTIs 122A-N). In some embodiments, an instance of the packet maximum identifiers 118A-N can be updated dynamically by the PFS 114 as time elapses. In various embodiments, the PFS 114 may be instructed or otherwise perform commands at the instruction of an element of the core network 140, such as the proxy server 150 of the core network 140. As such, in various embodiments, the PFS 114 may be instructed by the proxy server 150 to perform one or more operations discussed herein to implement aspects of the ATP. It is understood that the examples provided are for illustration purposes only, and therefore should not be used as limiting in any way.

In various embodiments, the operating environment 100 can include the network 130 and the core network 140. Although the core network 140 is illustrated in FIG. 1 as being located outside of the network 130, it is understood that, in some embodiments, the core network 140 may be included, located, or otherwise operate within at least a portion of the network 130. For clarity purposes, the core network 140 is shown in FIG. 1 as being between the RAN 110 and the network 130, however this may not necessarily be the case in other embodiments. It is understood that, in some embodiments, the RAN 110 may communicate directly with the network 130. It is also understood that, in some embodiments, the RAN 110 may be supported or otherwise operate as part of the network 130 and/or the core network 140. For example, in some embodiments, the RAN 110 may operate, at least in part, as a virtual radio access network, where at least a portion of the computing systems and devices that support one or more instances of the cell site 112 may be virtualized, and thus reside or otherwise operate as part of a datacenter or other network virtualization platform. As such, in some embodiments, elements that support the functionality and operation of one or more of the RAN 110, the core network 140, and/or the network 130 may be provided by one or more elements discussed with respect to a virtualized datacenter cloud illustrated in FIG. 5 and/or a network virtualization platform illustrated in FIG. 7. It is understood that the examples provided are for illustration purposes only, and therefore should not be used as limiting in any way.

In various embodiments, the network 130 can include almost any type of computer networks as well as communications networks. The network 130 can be hosted, in part or in whole, by systems of a communications service provider. The network 130 can include one or more of a radio access network (e.g., the RAN 110), a core network (e.g., the core network 140), an IP-based network, a transport network, an optical transport network, a circuit switched network, a mobile Wide Area Network, a combination thereof, or the like. The network 130 can host, be in communication with, and/or provide access to one or more network devices that can host one or more instances of virtualized and/or non-virtualized network services. For example, in some embodiments, the network 130 can provide access to one or more of the foreground source server 132 and/or the background source server 136. In various embodiments, the foreground source server 132 and/or the background source server 136 can support, host, or otherwise facilitate operation of a network service that can be accessed by one or more of the client devices 102A-N via the network 130. Examples of a network service that can be provided by the foreground source server 132 and/or the background source server 136 can include, but should not be limited to communication services, compute services, data storage and retrieval services, routing services, switching services, relay services, software-as-a-service, streaming content services, location and mapping services, and/or other virtualized or non-virtualized network service. It should be understood that the term "service" should be construed as one or more executing applications that can provide a set of communication and/or network functions on behalf of the computing system and/or the network 130, and therefore use of the term "service" does not include, and should not be construed or interpreted to include or be directed to, any abstract idea, judicial exception, or non-patent eligible subject matter. The network services can be used by a service provider, by third parties, and/or by customers via user equipment, servers, and/or other virtualized and/or non-virtualized computing systems. Further discussion of aspects that can be provided by an example embodiment of a network (e.g., the network 130) is provided with respect to FIG. 6. It should be understood that the examples provided are for illustration purposes only, and therefore should not be construed as limiting in any way.

In various embodiments, the foreground source server 132 can be associated with one or more instances of a foreground application (e.g., the foreground application 104). As such, an instance of a client device (e.g., any of the client devices 102A-N) may request executable data content or other data from the foreground source server 132, where the request for content is relayed via one or more of the RAN 110, the core network 140, and/or the network 130. For example, the foreground application 104 may request an instance of the foreground content package 134 from the foreground source server 132. The foreground content package 134 can include any computer readable and/or executable data that can be consumed by, or is otherwise associated with, the foreground application 104. As such, a portion and/or all of the requested data (e.g., the foreground content package 134) can include a plurality of foreground data packets 166 that can be delivered or otherwise provided to the requesting client device as an instance of the foreground traffic flow 164. Similarly, the background source server 136 can be associated with one or more instances of a background application (e.g., the background application 106). As such, an instance of a client device (e.g., any of the client devices 102A-N) may request and/or may be pushed executable data content or other data from the background source server 136, where the data can be relayed via one or more of the RAN 110, the core network 140, and/or the network 130. For example, background source server 136 may seek to push or otherwise provide the background application 106 with an instance of the foreground content package 134 from the foreground source server 132. Examples of the background content package 138 can include, but should not be limited to, a firmware update package, software updates, real-time streaming data associated with the background application (e.g., traffic information, weather information, stock market information, etc.), or the like. It is understood that the background content package 138 may pertain to any data that is insensitive to delivery delays, and thus is not latency sensitive. The background content package 138 can include any computer readable and/or executable data that can be consumed by, or is otherwise associated with, the background application 106. As such, a portion and/or all of the background data (e.g., from the background content package 138) can include a plurality of low priority data packets, such as the low priority data packets 162, that can be delivered or otherwise provided to the client device as an instance of the background traffic flow 160. An example embodiment of a computing system that can be configured as, or at least similar to, an instance of the foreground source server 132 and/or the background source server 136 is discussed with respect to a computing system of FIG. 8. In some embodiments, the foreground source server 132 and/or the background source server 136 may be configured to operate as part of a virtualized datacenter cloud discussed with respect to FIG. 5 and/or as part of a network virtualization platform discussed with respect to FIG. 7. It should be understood that the examples provided are for illustration purposes only, and therefore should not be construed as limiting in any way.

In various embodiments, the core network 140 can provide various network operations that serve as a backbone of the network 130. In some embodiments, the core network 140 can include an instance of the proxy server 150 and a transport host platform 142. The transport host platform 142 refers to various computing systems and network devices that support operation and functionality of the core network 140. The transport host platform 142 can provide support and functionality that conform to various industry and communication standards. As such, the core network 140 may support existing core infrastructure and new radio core infrastructure via one or more computing systems from the transport host platform 142. For example, in some embodiments, the core network 140 can include an evolved packet core 144 and/or a New Radio core 146. The evolved packet core 144 can provide devices and systems that facilitate and support operation of technologies that conform to standards such as 4G, LTE, LTE advanced, and other existing communication standards. The New Radio core 146 can provide devices and systems that facilitate and support operation of technologies that conform to new and future communication standards such as 5G, carrier aggregation, or any other New Radio standards. In some embodiments, the standard and/or technology that a client device invokes to connect with the RAN 110 may dictate which portion of the transport host platform 142 of the core network 140 is used. For example, if the client device 102A uses an LTE standard to communicate with the RAN 110, then the core network 140 may employ a packet data network gateway and/or serving gateway ("PGW/SGW") 145 of the evolved packet core 144. In another embodiment, if the client device 102A uses a 5G standard to communicate with the RAN 110, then the core network 140 may employ a session management function and/or a user plane function ("SMF/UPF") 147 of the New Radio core 146. One of ordinary skill in the technology is familiar with the network architecture that supports the evolved packet core 144 and/or the New Radio core 146, and therefore further explanation has been reserved. It should be understood that the examples provided are for illustration purposes only, and therefore should not be construed as limiting in any way.

In various embodiments, the ATP can be implemented via one or more systems and/or devices of the operating environment 100, including but not limited to the cell site 112, the RAN 110, and the core network 140. In some embodiments, the ATP can be implemented via an instance of the proxy server 150. In various embodiments, the ATP provides a low-priority transport protocol for cellular networks (or any other network that implements per-device queues), and thus can be employed for use at a transport layer within the operating environment 100, such as a transport layer as understood according to the open systems interconnect ("OSI") model. It is understood that in some embodiments, the ATP may be implemented via one or more devices, including but not limited to, an origin server, a cloud server, an edge node, an element of the RAN 110, a device of the core network 140, and/or any other device that operates, supports, or otherwise facilitates a transport layer functionality. For clarity, operations and functionality of the ATP will be discussed with respect to the proxy server 150 and the RAN 110. It should be understood that the examples provided are for illustration purposes only, and therefore should not be construed as limiting in any way.

In various embodiments, the proxy server 150 can include an instance of a processor, such as processor 151, and a memory, such as memory 152. In various embodiments, the processor 151 can include one or more processing units that are configured as hardware components that perform computations to process data, via execute computer-executable instructions from one or more application programs, routines, operating systems, and/or other software, to provide, at least in part, any of the operations or composition of functions described herein. For example, the processor 151 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 151 as a processing unit and/or compute resources can be found with respect to FIG. 7 and FIG. 8. In some embodiments, the processor 151 may support one or more aspects of a physical network topology and/or a virtual network topology, such as discussed in further detail with respect to FIG. 5. In various embodiments, the memory 152 can include one or more memory storage devices that include hardware components that perform storage operations, including temporary or permanent storage operations.

In some embodiments, the memory 152 can include volatile and/or non-volatile memory implemented in any method or technology for storage of information such as computer-readable instructions, data structures, program modules, or other data disclosed herein. It is understood that, in the claims, use of the terms "memory," "computer storage medium," or variations thereof, does not include, and shall not be construed or interpreted to include, a wave or signal per se and/or communication media.

In some embodiments, the memory 152 can store an application or other computer readable and/or executable instructions that support or otherwise facilitate operation of the ATP, such as an Agile Transport Protocol application ("ATP application") 154. The ATP application 154 can include one or more sets of executable instructions that can cause the performance of one or more operations discussed herein. In some embodiments, a particular mode or operating scheme of the ATP can be implemented via a particular script of the ATP application 154. For example, in some embodiments, the ATP application 154 can include a flow aware script 155, a gradually aggressive probing ("GAP") script$_1$ 156, a GAP script$_2$ 157, and a GAP script$_3$ 158. Each of the flow aware script 155, the GAP script$_1$ 156, the GAP script$_2$ 157, and the GAP script$_3$ 158 can correspond with a normal mode, a GAP$_1$ mode, a GAP$_2$ mode, and a GAP$_3$ mode, respectively, of the ATP. As discussed below in FIG. 3B, each iteration of gradually aggressive probing can correspond with an instance of a GAP mode. A state machine flow diagram for the various modes of the ATP is shown and discussed with respect to FIG. 3B. For clarity, operations and functions discussed herein can be provided by execution of the ATP application 154 by the processor 151, and thus operations will be discussed with respect to the proxy server 150. However, it is understood that, in various embodiments, one or more elements of the operating environment 100 may execute or otherwise perform operations using the ATP application 154, such as the cell site 112. It should be understood that the examples provided are for illustration purposes only, and therefore should not be construed as limiting in any way.

In some embodiments, the ATP application 154 may operate as a part of and/or in coordination with the PFS 114 of an instance of the cell site 112. In various embodiments, the proxy server 150 can implement the ATP through one or more operations. For clarity purposes, one or more operations discussed herein may be provided with respect to the proxy server 150; however, it is understood that other elements of the operating environment 100 may perform one or more operations discussed herein, such as but not limited to, the PFS 114, the RAN 110, the proxy server 150, the transport host platform 142, the foreground source server 132, the background source server 136, the network 130, or network devices as understood by one of ordinary skill. In various embodiments, the proxy server 150 can identify and select which queue of the cell site 112 to analyze and probe for spare capacity, such as one of the queues 116A-N. Each of the queues 116A-N may have been constructed by the cell site 112 for a particular client device, such as the client devices 102A-N, respectively. The cell site 112 may provide the proxy server 150 with access to the current and/or previous status of each of the queues 116A-N, and thus enable the proxy server 150 (or any other device or system that implements the ATP, such as via execution of the ATP application 154) to determine and analyze various parameters corresponding to a client device, communication path, and queue, such as a signal quality of a device connected to the cell site 112 (e.g., via the signal strength indicator 103A corresponding to the client device 102A connected to the cell site 112 via the communication path 1), recent throughput history of a communication path associated with the queue (e.g., the communication path 1 associated with the queue 116A and the client device 102A), and history of queue length (i.e., amount of data packets in queue for delivery over one or more TTIs 122A-N).

In various embodiments, the proxy server 150 may obtain or otherwise have access to one or more instances of acknowledges ("ACKs") 167A-N that each correspond to a particular client device. An instance of the ACKs 167A-N may pass through one or more of the cell site 112, the RAN 110, the core network 140, and/or the network 130. As such, in various embodiments, the proxy server 150 may intercept an instance of the ACKs 167A-N, analyze the acknowledgement, and release the acknowledge to the destined target. In some embodiments, the proxy server 150 may obtain a history or log of the ACKs 167A-N from the cell site 112 and/or generate an acknowledge log independently. For clarity purposes only, discussion of the ACKs 167A-N may be in reference to a particular client device of the operating environment 100 (e.g., the client device 102A), however it is understood that one or more instances of the ACKs 167A-N can correspond with any client device connected to the cell site 112 (e.g., the client devices 102B and 102N), in various embodiments. It should be understood that the examples provided are for illustration purposes only, and therefore should not be construed as limiting in any way.

In various embodiments, an instance of an acknowledgement (e.g., any of the ACKs 167A-N) can be generated by a client device in response to the client device receiving a data packet from the cell site 112. For example, in an embodiment where the foreground source server 132 seeks to provide data packets from the foreground content package 134 to the client device 102A (e.g., one or more instances of the foreground data packets 166 of the foreground traffic flow 164), then one or more instances of the foreground data packets 166 can pass through the cell site 122 and be delivered to the client device 102A via the queue 116A and the communication path 1. Upon receiving a data packet (e.g., an instance of the foreground data packets 166), the client device 102A can generate an acknowledgement (e.g., the ACK 167A) and send it back to the cell site 112, which in turn routes the acknowledgement back to the sender device, which in this example may be the foreground source server 132, but that may not necessarily be the case in every embodiment. It is understood that a sender device may be any device or system that initiates delivery of data to a client device, such as but not limited to one or more instances of the background source server 136, or in some embodiments, the proxy server 150. It should be understood that the examples provided are for illustration purposes only, and therefore should not be construed as limiting in any way.

In various embodiments, the proxy server 150 and/or the cell site 112 does not make changes to the client-side software executing on the client device, such as any of the client devices 102A-N. As such, implementation of operations discussed herein can reduce the burden on client devices by avoiding changes to client-side operations, while also improving performance of the RAN 110 and individual instances of the cell site 112 through efficient utilization of network resources, thereby enabling faster delivery of data packets and decreased strain on processing resources and memory resources. The proxy server 150 can enable a timestamp option at the cell site 112 so that the received time stamps of data packets can be observed via the ACKs 167A-N at a particular device, such as at the sender and/or an intermediary device (e.g., one or more of the foreground source server 132, the background source server 136, the core network 140, the RAN 110, and/or the cell site 112). In various embodiments, the ACKs 167A-N can include one or more fields that provide and indicate a timestamp of when the client device received the data packet, such as indicated by received timestamps 168A-N (shown in FIG. 1 as "$T_R$" 168A-N), and a timestamp of when the client device sent the acknowledge, such as indicated by sent timestamps 163A-N (shown in FIG. 1 as "$T_S$" 163A-N). In various embodiments, each ACKs 167A-N can indicate an identifier so as to provide a relative sequence of when one acknowledgement is received relative to a previous acknowledge. For example, each of the ACKs 167A-N can correspond with an instance of a sequence number, such as one of the sequence numbers 169A-N, respectively.

In various embodiments, the proxy server 150 can recreate the schedule for a particular queue over one or more of the TTIs 122A-N so as to determine capacity and congestion (also referred to as busyness and/or competition) associated with a particular communication path. For example purposes only, a discussion of reconstructing a schedule for an instance of the queue 116A associated with the communication path 1 and the client device 102A is provided. In various embodiments, the proxy server 150 can create a client queue, such as an instance of one of client queues 170A-N, that enables the proxy server 150 to recreate a queue schedule at the cell site 112, such as by analyzing packet inter-arrival times as discussed below. The client queues 170A-N can correspond with the queues 116A-N, respectively, and thus in turn are also associated with the corresponding communication path and client devices, such as the communication paths 1, 2, and 3, respectively, and client devices 102A-N, respectively. Each of the client queues 170A-N can include an instance of a queue length indicator 171, which can indicate the amount of data packets that are queued and ready for delivery to a particular client device, such as the client device 102A. In some embodiments, the queue length indicator 171 may be measured in terms of cumulative data size (e.g., kilobytes, megabytes, etc.) of the particular queue, such as the queues 116A-N. In various embodiments, implementation of the ATP can reduce the queue length for a particular one of the queues 116A-N by delivering data packets from the queue more quickly, thereby draining the amount of data packets remaining in the queue, which can be indicated by updates to the queue length indicator 171. In turn, implementation of the ATP can increase the amount of empty queues because competition for scheduling of resources is reduced, which in turn can allow for a significantly lower average queue length than conventional transport protocols.

In various embodiments, the proxy server 150 can estimate or otherwise determine a capacity of a communication path for delivering data packets to a client device. In various embodiments, the capacity may be measured as a throughput of a communication path, such as one of the communication paths 1, 2, and/or 3. The proxy server 150 can determine the capacity for a particular one of the communication paths by creating an instance of a communication path capacity indicator 172. In some embodiments, an instance of the communication path capacity indicator 172 can provide an estimate of measured capacity in units of bits per second (e.g., kilobits/second, megabits/second, gigabits/second, terabits/second, etc.). In various embodiments, the communication path capacity indicator 172 can indicate an estimate of the maximum capacity of the communication path (e.g., one of the communication paths 1, 2, and/or 3). As the proxy server 150 continues probing for spare capacity of the communication path, the communication path capacity indicator 172 may be updated. In various embodiments, an indication of the current sending rate of traffic via a communication path can be provided by a communication path rate indicator 173. To establish an initial estimate of the capacity of a communication path, the proxy server 150 can determine the number of packets sent from a particular queue per time transmission interval so as to establish values for the communication path rate indicator 173. Because the PFS 114 will allocate resources to provide full capacity for at least one instance of a TTI (e.g., one of the TTIs 122A-N), the proxy server 150 can determine the maximum amount of data sent per TTI (which may be indicated by an instance of the communication path rate indicator 173), and in turn can store the maximum capacity rate in the communication path capacity indicator 172.

In various embodiments, the determination of capacity for a communication channel can be further refined and updated based on analysis and performance of gradually aggressive probing for capacity that was not originally detected and is (or could be) available for use in scheduling data packets for delivery to a client device. The proxy server 150 can assemble a plurality of probe burst packet sets, such as the probe burst packet sets 180A-N, that can be used to probe for spare capacity of the corresponding communication path, such as the communication path 1. A communication path (e.g., any of the communication paths 1, 2, and/or 3) can have spare capacity when less than the maximum capacity of the communication path is being utilized. As such, the spare capacity of a communication path may vary depending on the number and size of traffic flows being delivered via a communication path over one or more of the TTIs 122A-N. In various embodiments, the spare capacity of a communication path can be determined by the proxy server 150 by determining the difference between the communication path capacity and the current load of the communication path, such as the difference between the values of the communication path capacity indicator 172 and the communication path rate indicator 173. The spare capacity for a communication path can be determined, and the proxy server 150 can indicate the amount of spare capacity by creating and/or updating an instance of a spare capacity indicator 176, which corresponds to a particular communication path. The spare capacity indicator 176 can be dynamically updated based on current determinations during gradually aggressive probing of the communication path.

In various embodiments, the proxy server 150 can probe for spare capacity of the communication path by delivering data packets in gradually larger bursts (i.e., the amount of data is larger with each iteration of data bursts being delivered to the particular client device). To increase utilization of resources and capacity of a particular communication path, the proxy server 150 can initiate probing for spare capacity. In some embodiments, the proxy server 150 can create or otherwise assemble the probe burst packet sets 180A-N from instances of the low priority data packets 162 that are part of the background traffic flow 160 that is to be delivered to the client device, such as the client device 102A. For example, in an embodiment, at least three instances of a probe burst packet set can be assembled for use in probing, such as the probe burst packet set 180A, a probe burst packet set 180B, and a probe burst packet set 180C, which can be among the probe burst packet sets 180A-N. Each of the probe burst packet sets 180A-N may be used or otherwise implemented as part of a gradually aggressive probing mode, such as discussed below with respect to FIG. 3B.

Each of the probe burst packet sets 180A-N can provide a different amount of data with each burst, and thus can each correspond with a different instance of a probe burst size 181A-N. Each of the probe burst sizes 181A-N indicates a data size (e.g., measured in kilobits, megabits, terabits, etc.) of a corresponding probe burst packet set (e.g., one of the probe burst packet sets 180A-N). As discussed below with respect to FIG. 3B, each successive probe burst packet set can be larger than the next, thereby enabling the proxy server 150 to probe for spare capacity by delivering increasingly larger sets of data packets so as to improve the accuracy of estimated capacity and/or spare capacity. For example, in an embodiment, the probe burst packet sets 180A, 180B, and 180C may be referred to as a first, second, and third probe burst packet set, respectively. As such, the probe burst packet set 180B can have a larger data size (and thus provide a larger burst of data packets) than the probe burst packet set 180A. Similarly, the probe burst packet set 180C can have a larger data size than the probe burst packet set 180B. Although only three instances of a probe burst packet set are shown and discussed herein, it is understood that this may not necessarily be the case in all embodiments, and thus more than three probe burst packet sets may be implemented in various embodiments.

In various embodiments, the proxy server 150 can probe for spare capacity so as to determine when to efficiently deliver the background traffic flow 160 using only spare capacity by initiating incremental delivery of instances of the probe burst packet sets 180A-N. For example, in an embodiment, the proxy server 150 can deliver the probe burst packet set 180A that includes one or more instances of data packets, which may in some embodiments, be instances of the low priority data packets 162. The data packets of the probe burst packet set 180A can be added to the queue 116A, and delivered to the client device 102A using only spare capacity. The ATP application 154 can instruct the PFS 114 to deliver the probe burst packet set 180A (which may be referred to as a first probe burst packet set) via the communication path 1 so as to trigger the client device 102A to generate one or more instances of an acknowledgement (e.g., one or more of the ACKs 167A-N) in response to delivery of the probe burst packet set 180A. In some embodiments, an acknowledgement may be generated by the client device 102A for each data packet included within a probe burst packet set (e.g., the probe burst packet set 180A).

The proxy server 150 can determine whether the communication path 1 is busy and whether any traffic flows are competing to use the communication path 1 by analyzing acknowledgements received from the client device 102A (e.g., one or more of the ACKs 167A-N), specifically based on reconstructing the schedule at a device queue (e.g., the queue 116A) by analysis of received timestamps and packet inter-arrival times discussed below. In this example, the client device 102A received data packets from the probe burst packet set 180A during an instance of a TTI (e.g., the TTI 122A), and, in response, the client device 102A generated one or more of the ACKs 167A-N which were sent back via the communication path 1. An instance of an acknowledgement can be generated by the client device 102A for each data packet received, and therefore each of the ACKs 167A-N can indicate a sequence number and a received timestamp for a corresponding received data packet, such as each of the ACKs 167A-N having one of the sequence numbers 169A-N and one of the received timestamps 168A-N.

To detect competition and busyness of a communication path, the proxy server 150 can come to a determination as to whether a cell site 112 and/or communication path (e.g., one of the communication paths 1, 2, and/or 3) is busy based on multiple factors, such as use instances of the ACKs 167A-N from client device 102A (received in response to delivering data packets, such as from a traffic flow and/or one of the probe burst packet sets 180A-N) to analyze received timestamps and packet inter-arrival times at the client device 102A, and also assessing the instantaneous sending rate of a communication path (e.g., the communication path rate indicator 173) relative to a maximum capacity rate (e.g., the communication path capacity indicator 172) and/or busyness threshold (e.g., the busyness threshold value 177). A packet inter-arrival time refers to the amount of time that elapses between the arrival of two data packet instances that are received at a client device, such as the client device 102A, and indicated by an acknowledgement (e.g., one or more instances of the ACKs 167A-N). Because each of the ACKs 167A-N corresponds with the arrival of a particular data packet (e.g., one of the foreground data packets 166, the low priority data packets 162, a data packet from one of the probe burst packet sets 180A-N, or other data packet arriving at a client device), each of the ACKs 167A-N has a sequence number and received timestamp, such as one of the received timestamps 168A-N and one of the sequence numbers 169A-N.

In some embodiments, the PFS 114 of the cell site 112 and/or a client device may engage in packet batching, which means that the number of data packets which could be sent over multiple TTIs are combined and delivered during one TTI. Stated differently, packet batching combines two (or more) TTIs worth of data into one TTI. During the initial delivery of a traffic flow from the cell site 112, the PFS 114 may engage in packet batching irrespective of whether there is only one client device being served by the cell site 112, or two or more client devices being served. Packet batching can be implemented by the PFS 114 (e.g., when scheduling delivery of data packets during a TTI) and/or a client device (e.g., when responding with acknowledgements that are received by the cell site 112). Packet batching can cause data packets (and/or acknowledgements) to arrive at a client device (or cell site) in a discontinuous manner because data packets (and/or acknowledgements) may not be sent to and/or from the client device in every TTI. Packet batching and delayed acknowledgements are noteworthy because, in some embodiments, technical issues may arise in cellular networks implementing conventional transport protocols (e.g., TCP, TCP-LP, etc.) to yield inaccurate information about congestion and capacity when packet batching occurs. For example, packet batching may cause the client device 102A to generate a cumulative acknowledgement (which has multiple acknowledgements combined together forming a cumulative acknowledgement) based on twice the number of data packets being delivered to the client device during a TTI (e.g., two TTIs worth of data sent during one TTI). In other instances, the client device may delay sending acknowledgements, and thus the cumulative acknowledgement may be sent during one TTI instead of multiple acknowledgements sent over continuous TTIs. Therefore, received timestamps between two acknowledgements may not match (i.e., be the same) due to packet batching and/or delayed acknowledgements, which may cause some devices implementing conventional transport protocols to infer an inflated capacity and erroneously (and/or spuriously) assume that a packet inter-arrival discontinuity (discussed below) has occurred (or otherwise exists), when in reality the capacity may be much lower than estimated, thereby affecting whether the communication path is considered to be busy and whether there exists spare capacity. As such, conventional transport protocols in cellular networks may not enable distinguishment between cases where: the PFS 114 is not using packet batching to send separate flows to two client devices, thereby causing acknowledgement to appear discontinuous; the PFS 114 is using packet batching to send data packets to one client device being service at the cell site 112, thereby causing acknowledgements to arrive back at the PFS 114 discontinuously; and the PFS 114 is using packet batching to send data packets to each of two client devices, thereby causing acknowledgements to return from each of the two client devices discontinuously. The ATP can mitigate against possible errors in determining capacity, competition, and congestion at the cell site 112 (where such errors may typically occur if conventional transport protocols were implemented) by having the proxy server 150 reconstruct the delivery schedule of the PFS 114, specifically by recreating the queue associated with a particular communication path and client device, such as creating the client queue 170A which can provide or otherwise reconstruct the queue 116A associated with the communication path 1 and the client device 102A, thereby enabling accurate estimates of maximum capacity and congestion of a communication path. As such, the proxy server can consider both the amount of data and the packet inter-arrival times to infer accurate capacity and competition along a communication path.

To detect for spare capacity and determine the busyness of a cell site, the proxy server 150 may first compare acknowledgements for a specific communication path. The proxy server 150 can compare one acknowledgement with a another (previous) acknowledgement and determine whether they are in sequence based on the corresponding sequence numbers being sequential. The proxy server 150 can compare the received timestamps of two sequential acknowledgements to determine whether the received timestamps match. If the received timestamps of the two acknowledgements match (i.e., are identical), then the proxy server 150 can accumulate or otherwise collect other acknowledgements that are in sequence and have received timestamps which match each other. The proxy server 150 can continue to analyze acknowledgements until the proxy server 150 detects that received timestamps do not match between two sequential acknowledgements (e.g., two of the received timestamps 168A-N corresponding to two of the ACKs 167A-N).

If the received timestamp included in each of the two sequential acknowledgements do not match each other (i.e., not identical), then the proxy server 150 can determine whether a packet inter-arrival discontinuity, such as a packet inter-arrival discontinuity 178, exists between the two sequential acknowledgements (i.e., between two acknowledgements which have sequence numbers that are sequential). A packet inter-arrival discontinuity (e.g., the packet inter-arrival discontinuity 178) occurs (or otherwise exists) when, between two acknowledgements, one received timestamp (from one acknowledgement) differs from the previous received timestamp (i.e., the received time stamp in the previous acknowledgement) by more than one TTI. If a packet inter-arrival discontinuity does not exist, then the acknowledges would be considered to be contiguous ("back-to-back"). A specific example discussing packet inter-arrival discontinuity is provided below with respect to FIG. 2. For clarity, a discussion of operations that may be performed based on whether or not a packet inter-arrival discontinuity is detected will be provided below.

If a packet inter-arrival discontinuity does not exist between two sequential acknowledgements (i.e., if one received timestamp does not differ from a previous received timestamp by more than one TTI), then the two acknowledgements are determined to still be contiguous (i.e., received "back-to-back") despite the received timestamps being different by one TTI or less, and therefore the corresponding communication path (e.g., the communication path 1) to the cell site 112 is determined to be not busy. Stated differently, the proxy server 150 can determine that a communication path (and thus also the cell site 112) is not busy based on the lack of a packet inter-arrival discontinuity (e.g., the packet inter-arrival discontinuity 178) despite determining that the received timestamps are different for sequential acknowledgements (i.e., where two acknowledgements have sequence numbers which are sequential to each other) as long as the difference is by one TTI or less. In various embodiments, if the proxy server 150 determines that a packet inter-arrival discontinuity does not exist (i.e., if one received timestamp does not differ from a previous received timestamp by more than one TTI), the proxy server 150 can continue to update the maximum capacity value of the communication path (as indicated by the communication path capacity indicator 172) unconditionally so that the value reflected by the communication path capacity indicator 172 can increase or decrease based on communication path and cell site conditions, thereby enabling a more accurate estimate of the maximum capacity of the communication path. The proxy server 150 may update the value provided by the communication path capacity indicator 172 between each interval of delivering an instance of a probe burst packet set (i.e., during implementation of a GAP mode, such as discussed below). In some embodiments, the communication path capacity indicator 172 can reflect an exponential averaging using a fractional weight of a newly updated instance of the communication path rate indicator 173.

If a packet inter-arrival discontinuity exists between two acknowledgements (i.e., if one received timestamp differs from a previous received timestamp by more than one TTI), then the two acknowledgements are determined to be discontinuous (i.e., not "back-to-back"), and thus the proxy server 150 may (in response to the packet inter-arrival discontinuity existing) determine whether the communication path is busy by analyzing the instantaneous sending rate of the communication path relative to a busyness threshold and a maximum capacity. Stated differently, in various embodiments, if the acknowledgements under analysis are not back-to-back (e.g., because the acknowledgements indicate a packet inter-arrival discontinuity and therefore the acknowledgements are not contiguous), then the proxy server 150 can determine the amount of data sent per TTI (i.e., the instantaneous rate in terms of data packets per TTI) for the previous TTI slot (e.g., instances of the communication path rate indicator 173 which can provide an instantaneous rate of traffic flow transfer in terms of data packets per TTI). First, the proxy server 150 can determine the capacity of the communication path, and then establish a busyness threshold by which to compare the instantaneous sending rate of the communication path. Because the proxy server 150 anticipates the PFS 114 to allocate full resources for at least one TTI (thereby achieving full capacity as indicated by the communication path capacity indicator 172), the proxy server 150 can infer or otherwise determine (or in some embodiments update) the capacity of the communication path by inspecting the amount of data sent per TTI, and in turn using the maximum number of data packets sent within a TTI instance to set the maximum capacity (which may be measured in throughput) of the communication path, where the maximum capacity (i.e., highest sending rate capable of the communication path) can be indicated by the communication path capacity indicator 172. The proxy server 150 can record, instantiate, update, or otherwise indicate the capacity of the communication path via the communication path capacity indicator 172.

With the estimate for the maximum capacity of the communication path generated, the proxy server 150 can analyze the instantaneous sending rate relative to the maximum capacity to detect busyness. In various embodiments, the proxy server 150 can detect busyness (which may also be referred to as congestion and/or competition) by analyzing the communication path rate indicator 173 in relation to a busyness threshold factor, such as busyness threshold factor 175, which in some embodiments may be represented by the term "k." The busyness threshold factor 175 can provide a value that is normalized, and thus can indicate a value ranging from 0 to 1. When the busyness threshold factor 175 equals or is otherwise set to "0," the proxy server 150 instructs the PFS 114 not to yield capacity and/or resources to a foreground traffic flow when a background traffic flow is being delivered. When the busyness threshold factor 175 equals or is otherwise set to "1," the proxy server 150 would instruct the PFS 114 to deliver an instance of the background traffic flow 160 only when there are no other senders using the communication path (i.e., when the communication path is not being utilized to send any other foreground traffic flow or background traffic flow, and thus the cell site 112 is dedicating all of the resources and capacity of the communication path to deliver a background traffic flow from one sender, such as from only the background source server 136). In various embodiments, the proxy server 150 can instruct the PFS 114 to use only spare capacity to deliver an instance of low priority data packets 162 of the background traffic flow 160 by setting the busyness threshold factor 175 to a value between "0" and "1," such as "0.5" or any other value between the bounded range. For example, when the busyness threshold factor 175 is configured to indicate a value of "0.5," the PFS 114 is instructed to balance resource utilization and performance between delivery of foreground traffic flows, while also delivering background traffic flows using only spare capacity. In various embodiments, the proxy server 150 can compare the communication path rate indicator 173 (which provides an instantaneous sending rate) to the communication path capacity indicator 172.

Generally, if the communication path rate indicator 173 is equal or very close to the communication path capacity indicator 172 in value, then that means there exists no other traffic flows utilizing the communication path. If there are other traffic flows (background and/or foreground) utilizing the communication path (and/or if there are not enough data packets at the cell site 112 to consume all of the PRBs 120), then the communication path rate indicator 173 will indicate a value that is less than the communication path capacity indicator 172. The proxy server 150 can indicate a specific threshold for busyness by combining the communication path capacity indicator 172 with the busyness threshold factor 175, which in turn yields a busyness threshold value ("busyness threshold") 177 (which is measured in the same units as the communication path rate indicator 173). As such, the proxy server 150 can compare the communication path rate indicator 173 to the busyness threshold value 177. If the communication path rate indicator 173 is above or otherwise greater than the busyness threshold value 177, then the instantaneous sending rate (as indicated by the communication path rate indicator 173) is closer to the maximum capacity (as indicated by the communication path capacity indicator 172), and therefore the communication path would be designated as being not busy. However, if the communication path rate indicator 173 provides a value that is less than the busyness threshold value 177 (and thus not very close to the maximum capacity of the communication path as indicated by the communication path capacity indicator 172), then the communication path would be designated as being busy. If the communication path is busy, then the PFS 114 would no longer be able to deliver (or continue delivering) a background traffic flow using spare capacity. Therefore, the proxy server 150 can detect competition of other senders using the communication path based on a communication path being busy. In some embodiments, if a communication path is busy, the proxy server 150 can infer that the PRBs 120 are being utilized to deliver foreground traffic flows, and thus the cell site 112 may also be designated as being busy.

In various embodiments, the ATP application 154 may implement a background flow limiter 185 that can execute on the proxy server 150. The background flow limiter 185 can monitor and maintain a reserve capacity of the communication path, where the reserve capacity provides congestion avoidance by establishing a boundary on the sending rate of any instances of the background traffic flow 160. In various embodiments, the reserve capacity can be established and/or adjusted by limiting the delivery of an instance of the background traffic flow 160 to no more than the communication path capacity indicator 172 multiplied by a capacity reserve factor 174. The capacity reserve factor 174 can be a normalized value that is between "0" and "1." As such, when the capacity reserve factor 174 is multiplied by the communication path capacity indicator 172, the upper boundary for the sending rate is established. For example, in some embodiments, the maximum sending rate at which an instance of the background traffic flow 160 should be delivered using spare capacity may be set at 80% of the maximum capacity. As such, in this example, the capacity reserve factor 174 can be set to 0.8, which when multiplied by the communication path capacity indicator 172, yields the background flow rate limit boundary. In various embodiments, the background flow limiter 185 may provide a user interface to a network administer so as to enable adjustment of the capacity reserve factor 174.

In various embodiments, after delivering the first probe burst packet set (e.g., the probe burst packet set 180A) and determining that the communication path (e.g., the communication path 1 to the client device 102A) is not busy, the proxy server 150 can initiate the next gradually aggressive probing mode so as to further probe for capacity. For example, the proxy server 150 can deliver a second probe burst packet set, such as the probe burst packet set 180B, where the second probe burst packet set is larger than the first. The proxy server 150 can perform again one or more of the operations discussed above to update the estimate for capacity and busyness, such as detecting the existence of packet inter-arrival discontinuities and analyzing the communication path rate indicator 173 in relation to the busyness threshold value 177. After delivering the second probe burst packet set, if the proxy server 150 determines that the communication path remains not busy, then the proxy server 150 can initiate another gradually aggressive probing mode by delivering a third probe burst packet set, such as the probe burst packet set 180C. The proxy server 150 can again detect the existence of packet inter-arrival discontinuities and analyze the communication path rate indicator 173 in relation to the busyness threshold value 177 so as to update capacity and check again for busyness. If the communication path continues to remain not busy after delivering the third probe burst packet set, then the proxy server 150 can initiate normal mode, where the proxy server 150 can deliver the background traffic flow 160 (via instances of the low priority data packets 162) to the particular client device using only spare capacity, such as the client device 102A via the communication path 1. The proxy server 150 can continue to monitor and detect competition and busyness while the background traffic flow 160 is being delivered, and if a foreground traffic flow 164 is detected as being concurrently delivered to the client device (e.g., when the instantaneous sending rate falls below the busyness threshold—which may occur, for example, if the busyness threshold factor is set to 0.5 and the instantaneous sending rate falls below 50% of the maximum capacity, then the communication path and/or cell site is determined to be busy), then the proxy server 150 can instruct the PFS 114 to exponentially back-off delivery of the background traffic flow 160 to yield capacity to the one or more foreground traffic flows being sent.

In various embodiments, if the proxy server 150 determines that the communication path is busy during an instance of a gradually aggressive probing mode, the proxy server 150 can activate one or more instance of a probe burst delay interval 182 that configures the PFS 114 to wait or otherwise hold off in probing for spare capacity, and therefore delay scheduling an instance of the background traffic flow 160 using spare capacity. In various embodiments, the amount of time that is indicated by the probe burst delay interval 182 can be fixed, dynamic, and/or random. In some embodiments, multiple instances of the probe burst delay interval 182 can be implemented, thereby instructing the PFS 114 to wait multiple iterations of the probe burst delay interval 182 so that the time between bursts that check for spare capacity is increased. As such, instead of focusing on providing weighted fairness of resources so that all traffic flows (foreground and background) are treated equally, implementation of the ATP explicitly instructs a cell site (e.g., the cell site 112) to yield capacity and resources to instances of foreground traffic flows (e.g., the foreground traffic flow 164). As such, the ATP provides a robust and efficient congestion control mechanism that reduces latency, provides improved performance for foreground and background applications on a client device (e.g., the foreground application 104 and the background application 106), and provides fairness in resource allocation among background applications (e.g., the background application 106) because all background traffic flows are delivered using only spare capacity.

In some embodiments, the proxy server 150 may analyze or otherwise monitor the total load of the communication path over time, specifically by analyzing the per-second throughput of foreground and background traffic flows to determine whether a particular cell site is yielding the delivery of low priority data packets of a background traffic flow to time-sensitive foreground traffic flows. In various embodiments, the traffic load levels for a particular communication path may be averaged over a defined time interval, and captured by a physical resource block utilization indicator ("$U_{PRB}$ indicator"), such as $U_{PRB}$ indicator 184. The proxy server 150 can dynamically reconfigure or otherwise adjust the probe burst size for a particular instance of a probe burst packet set (e.g., the probe burst sizes 181A-N corresponding to the probe burst packet sets 180A-

N, respectively) so that when a particular instance of a probe burst packet set is delivered (e.g., during a gradually aggressive probing mode), the collective data size of the probe burst packet set can mimic various sizes of foreground and/or background traffic flows. For example, in some embodiments, a foreground traffic flow may be considered to be "short," "medium," or "long," where a short flow may be less than one megabyte and represent web objects and mobile application communication packets. A medium flow may be one or more megabytes and represent transfers that, for example, mimic video data packets which provide video content from a streaming content service source. A long flow may be multiples of tens of megabytes so as to mimic application updates and data backups. Therefore, in some embodiments, the $U_{PRB}$ indicator 184 can be configured such that instances of a probe burst packet set (e.g., the probe burst packet sets 180A-C) can mimic one or more of a "low load," a "medium load," and a "high load." For example, in some embodiments, the average physical resource block utilization representing a "low load," a "medium load," and a "high load," may correspond with 30% of capacity, 60% of capacity, and 80% of capacity, respectively. As such, in an embodiment, the proxy server 150 may mimic the various load levels by adjusting or otherwise configuring instances of the $U_{PRB}$ indicator 184 to represent a value of "0.3," a value of "0.6," and a value "0.8," respectively. In some embodiments, the communication path capacity indicator 172 can be multiplied by the $U_{PRB}$ indicator 184 to yield a value representing the target physical resource block utilization that should be seen when providing data packets at various load levels. Based on discussion of the operations provided herein, the ATP can improve performance of cellular network data transfer by enabling higher utilization of capacity along communication paths, thereby out-performing conventional transport protocols which suffer from high queuing delays in cellular networks. It is understood that the examples discussed above are for illustration purposes only, and therefore should not be construed as limiting in any way.

It is understood that the concepts and technologies discussed herein improve the functioning of particular computing systems by solving technical challenges that arise because of, and specifically within, the realm to network technology pertaining to network transport protocols. It is understood that the examples provided are for illustration purposes only, and therefore should not be construed as limiting in any way.

FIG. 1 illustrates instances of the users 101A-N, the client devices 102A-N, the cell site 112, the RAN 110, the network 130, the foreground source server 132, the background source server 136, the core network 140, the transport host platform 142, the proxy server 150, and any of the elements included therein. It should be understood, however, that some implementations of the operating environment 100 can include zero, one, or more than one instances of these elements of the operating environment 100 shown in FIG. 1. As such, the illustrated embodiment of the operating environment 100 should be understood as being illustrative, and should not be construed as being limiting in any way.

Figure 2:
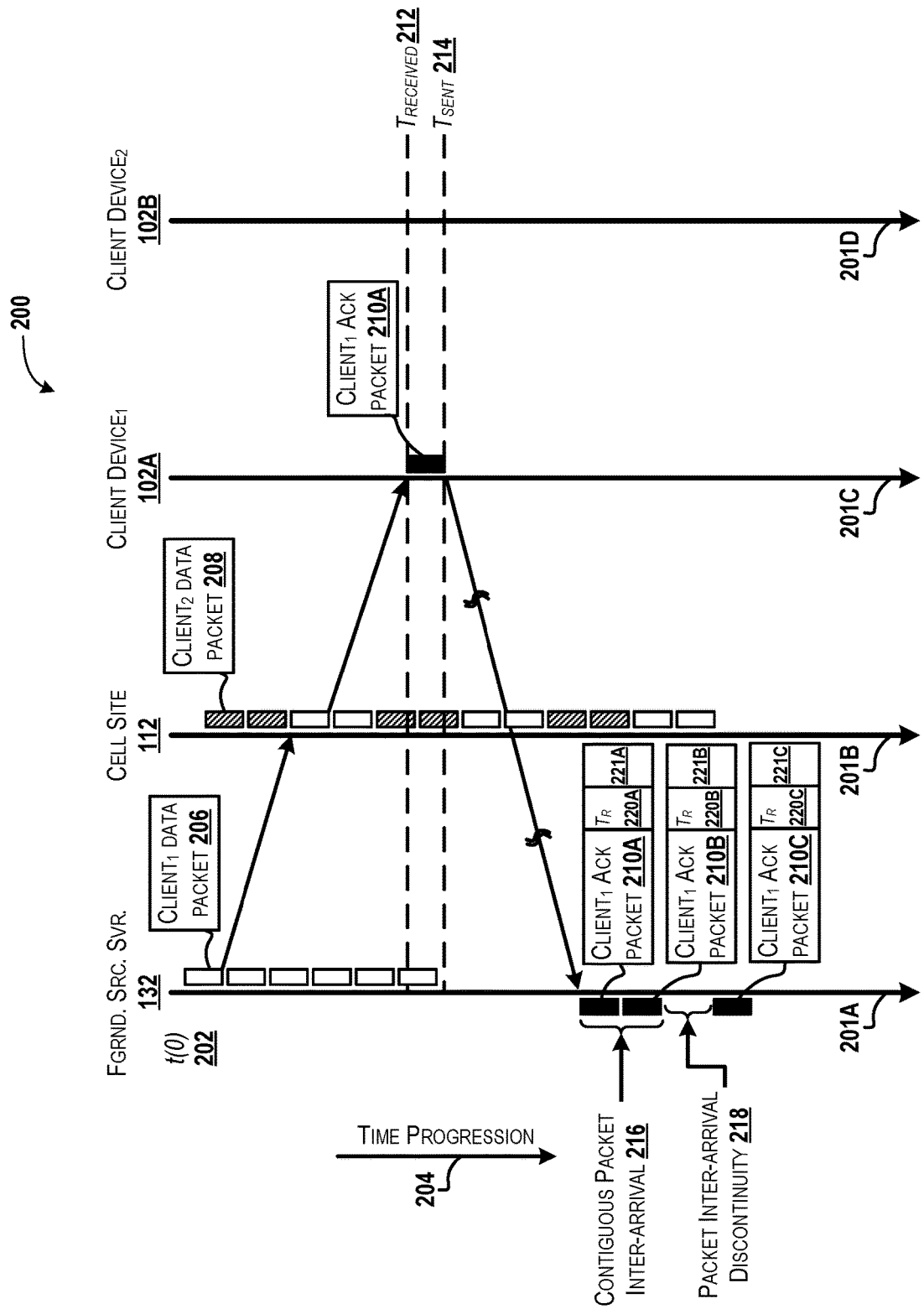
FIG. 2 is a diagram illustrating aspects for providing data packets to one or more client devices, according to an illustrative embodiment.

Turning now to FIG. 2, with continued reference to FIG. 1, aspects related to analysis of acknowledgements in response to providing data packets to one or more client devices will be discussed, according to an illustrative embodiment. A chart diagram 200 includes separate time progression indicators 201A-N which correspond with the foreground source server 132, the cell site 112, the client device 102A, and the client device 102B, respectively. As shown in FIG. 2, a time progression axis 204 can begin at an origin point, such as time zero ("t(0)") 202, and progress downwards. In some embodiments, a plurality of data packets (e.g., instances of foreground data packets 166) may be targeted for delivery from the foreground source server 132 to the client device 102A. As such, in some embodiments, the data packets which are to be delivered to the client device 102A may be routed to the cell site 112. This can be represented in FIG. 2 by instances of a client data packet 206 shown along the time progression indicator 201A as being provided to the cell site 112 shown along the time progression indicator 201B. The cell site 112 may identify which of the queues 116A-N correspond with the targeted client device (e.g., the queue 116A corresponding to the client device 102A). As such, the cell site 112 may handle a plurality of data packets that are directed to various client devices. For example, as illustrated in FIG. 2, the time progression indicator 201B corresponding to the cell site 112 can include one or more instances of data packets directed to the client device 102B, as represented by instances of a client data packet 208. In various embodiments, the cell site 112 can deliver an instance of a data packet (e.g., an instance of the client data packet 206) to the client device 102A. The time at which the client data packet 206 is received at the client device 102A is provided by a $T_{RECEIVED}$ ("$T_R$") indicator 212. In response to receiving the client data packet 206, the client device 102A can generate an acknowledgement, as indicated by a client acknowledgement packet 210A. The time at which the client acknowledgement packet 210A is sent can be indicated by a $T_{SENT}$ ("$T_S$") indicator 214. In various embodiments, instances of an acknowledgement can be generated in response to one or more (or each) data packet received by a client device, such as represented in FIG. 2 by client acknowledgement packets 210A, 210B, and 210C that can be generated by the client device 102A in response to receiving instances of the client data packet 206.

In various embodiments, the cell site 112 may serve as an intermediary between the foreground source server 132 and the client device 102A. As such, the cell site 112 can intercept and enable analysis of acknowledgements from one or more client devices, such as the client acknowledgement packets 210A, 210B, and 210C from the client device 102A. In an embodiment, the proxy server 150 may access or otherwise obtain acknowledgements (e.g., any of the client acknowledgement packets 210A, 210B, and 210C) from the cell site 112. The proxy server 150 may seek to probe for spare capacity by detecting or otherwise determining whether a packet inter-arrival discontinuity exists and determine whether a communication path and/or cell site is busy. For example, the acknowledgements which are generated by the client device 102A can indicate a sequence number and a received timestamp, such as sequence numbers 221A-C and received timestamps (e.g., the $T_R$ indicators 220A-C) for client acknowledgement packets 210A-C, respectively. In various embodiments, if two acknowledgements have sequence numbers which are sequential and the received timestamps of each acknowledgement is the same, or if different than still within one time transmission interval, then the acknowledgements may be considered to have a contiguous packet inter-arrival time (i.e., be contiguous or otherwise "back-to-back"), such as indicated by contiguous packet inter-arrival 216.

For example, in an embodiment, the client acknowledgement packets 210A and 210B can have sequence numbers 221A and 221B which are sequential. An instance of the contiguous packet inter-arrival 216 can occur if the received timestamps associated with the client acknowledgement packets 210A and 210B (here the $T_R$ indicators 220A and 220B) are the same, or if they are not the same, then the received timestamps would be within the one time transmission interval (i.e., the $T_R$ indicators 220A and 220B do not indicate a received time that is more than one time transmission interval, such as the TTI 122A). Comparatively, as illustrated in FIG. 2, a packet inter-arrival discontinuity 218 can occur when the received timestamps of two acknowledgements (e.g., the $T_R$ indicators 220B and 220C of the client acknowledgement packets 210B and 210C, respectively) are not the same, but rather differ by more than one time transmission interval. In some embodiments, the proxy server 150 can reconfigure a packet inter-arrival discontinuity to occur when the received timestamps of two sequential acknowledgements are not the same, but rather differ by more than two, instead of more than one, time transmission intervals. In an embodiment, the ATP can be considered to be operating in a "passive" mode when a packet inter-arrival discontinuity occurs in response to the received timestamps of two sequential acknowledgements differing by more than one time transmission interval. In another embodiment, the ATP can be considered to be operating in an "active" mode when a packet inter-arrival discontinuity occurs (i.e., when a packet inter-arrival discontinuity is found to exist) in response to the received timestamps of two sequential acknowledgements differing by more than two time transmission intervals. In some embodiments, acknowledgements which have differing sequence numbers, but the same received timestamps, may be considered to represent a contiguous packet inter-arrival time, and therefore would not be indicative of packet inter-arrival discontinuity. It is understood that the examples provided are for illustration purposes only, and therefore should not be construed as limiting in any way.

Figure 3A:
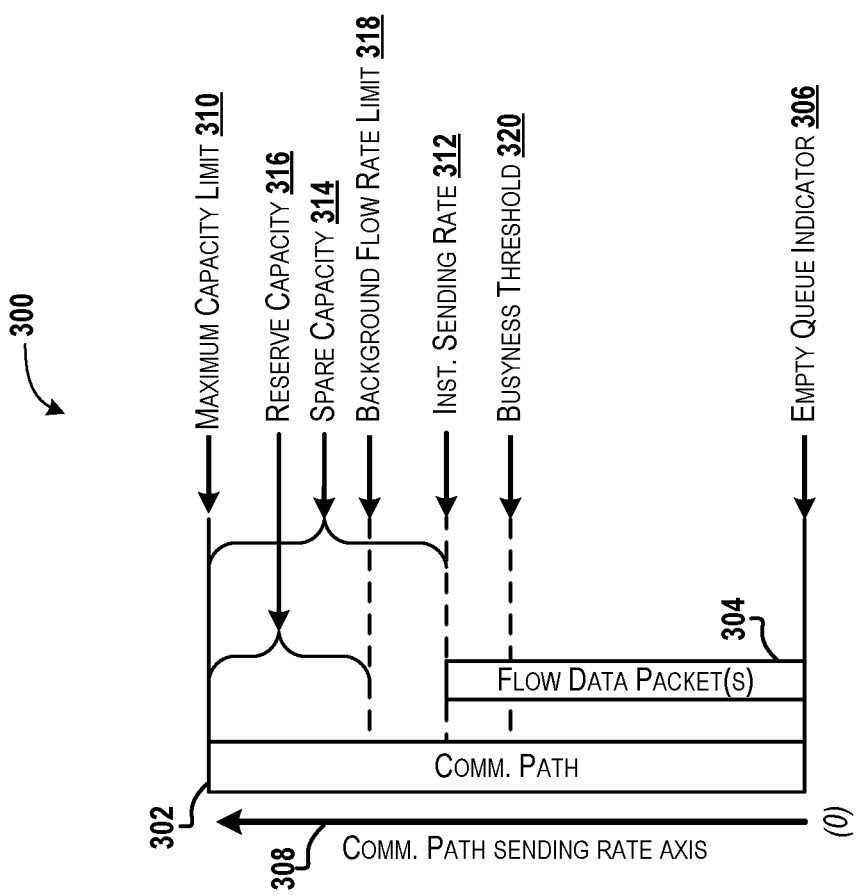
FIG. 3A is a block diagram illustrating an example communication path load associated with a client device and a cell site, according to an illustrative embodiment.

Turning now to FIG. 3A, with continued reference to at least FIG. 1, a load diagram 300 associated with an example communication path load will be discussed, according to an illustrative embodiment. The load diagram 300 can indicate various aspects associated with load levels of a communication path, which is illustrated as communication path 302. The communication path 302 can be associated with a client device and a queue of a cell site, such as the communication path 1 that is associated with the client device 102A and the queue 116A of the cell site 112. Instances of data packets can be delivered via a communication path, such as illustrated by flow data packets 304 corresponding to the communication path 302. The load diagram 300 can provide a communication path sending rate axis 308, which increases from an origin point. The origin point can correspond with an empty queue indicator 306 because an empty queue would not be delivering data packets along a communication path. As discussed with respect to FIG. 1, the proxy server 150 can detect the instantaneous rate at which a traffic flow is being (or was) sent to a client device, which is illustrated in FIG. 1 as instances of the communication path rate indicator 173.

As shown in FIG. 3A, an instantaneous sending rate 312 can indicate a current load level of the communication path by providing the instantaneous sending rate of data packets along a particular communication path. As such, the instantaneous sending rate 312 can correspond with the communication path rate indicator 173 shown and discussed with respect to FIG. 1. The maximum sending rate at which the communication path 302 can deliver data packets to a client device is illustrated as a maximum capacity limit 310, which can correspond with instances of the communication path capacity indicator 172 shown and discussed with respect to FIG. 1. An indication of a current amount of spare capacity of the communication path is illustrated as spare capacity 314, which corresponds with the difference in sending rates between the instantaneous sending rate 312 and the maximum capacity limit 310. The spare capacity 314 can correspond with the spare capacity indicator 176 shown and discussed with respect to FIG. 1.

In some embodiments, background traffic flows may be rate-limited to a fraction of the maximum capacity limit 310, such as shown by background flow rate limit 318. The background flow rate limit 318 may be defined or otherwise configured according to the capacity reserve factor 174 discussed with respect to FIG. 1. The difference between the background flow rate limit 318 and the maximum capacity limit 310 can be referred to as a reserve capacity, such as shown by reserve capacity 316. The reserve capacity 316 can enable concurrent delivery of foreground traffic flow so that one or more instances of background traffic flows can yield capacity, thereby prioritizing delivery of time-sensitive, delay-intolerant, foreground traffic flows. In various embodiments, the proxy server 150 can determine whether a communication path is busy based on analyzing the instantaneous sending rate 312 relative to the maximum capacity limit 310. The closer the instantaneous sending rate 312 is to the maximum capacity limit 310, the less likely the communication path is busy. As such, the level of demarcation at which the communication path is designated as being busy can be provided by the busyness threshold factor 175 discussed with respect to FIG. 1. As shown in FIG. 3A, a busyness threshold 320 can correspond with a level between the maximum capacity limit 310 and the empty queue indicator 306. For example, in an embodiment, the busyness threshold 320 can be configured as 50% of the maximum capacity limit 310, and thus if the instantaneous sending rate 312 falls below the busyness threshold 320, then the communication path 302 is considered to be busy. Each of the maximum capacity limit 310, the reserve capacity 316, the spare capacity 314, the background flow rate limit 318, the instantaneous sending rate 312, and the busyness threshold 320 can be associated with various levels of throughput (i.e., sending rate) for a communication path for a specific period of time. As such, the particular values indicated or otherwise represented by each of the elements discussed above may change or otherwise be updated as more accurate analysis of the communication path is provided. It is understood that the examples provided are for illustration purposes only, and therefore should not be construed as limiting in any way.

Figure 3B:
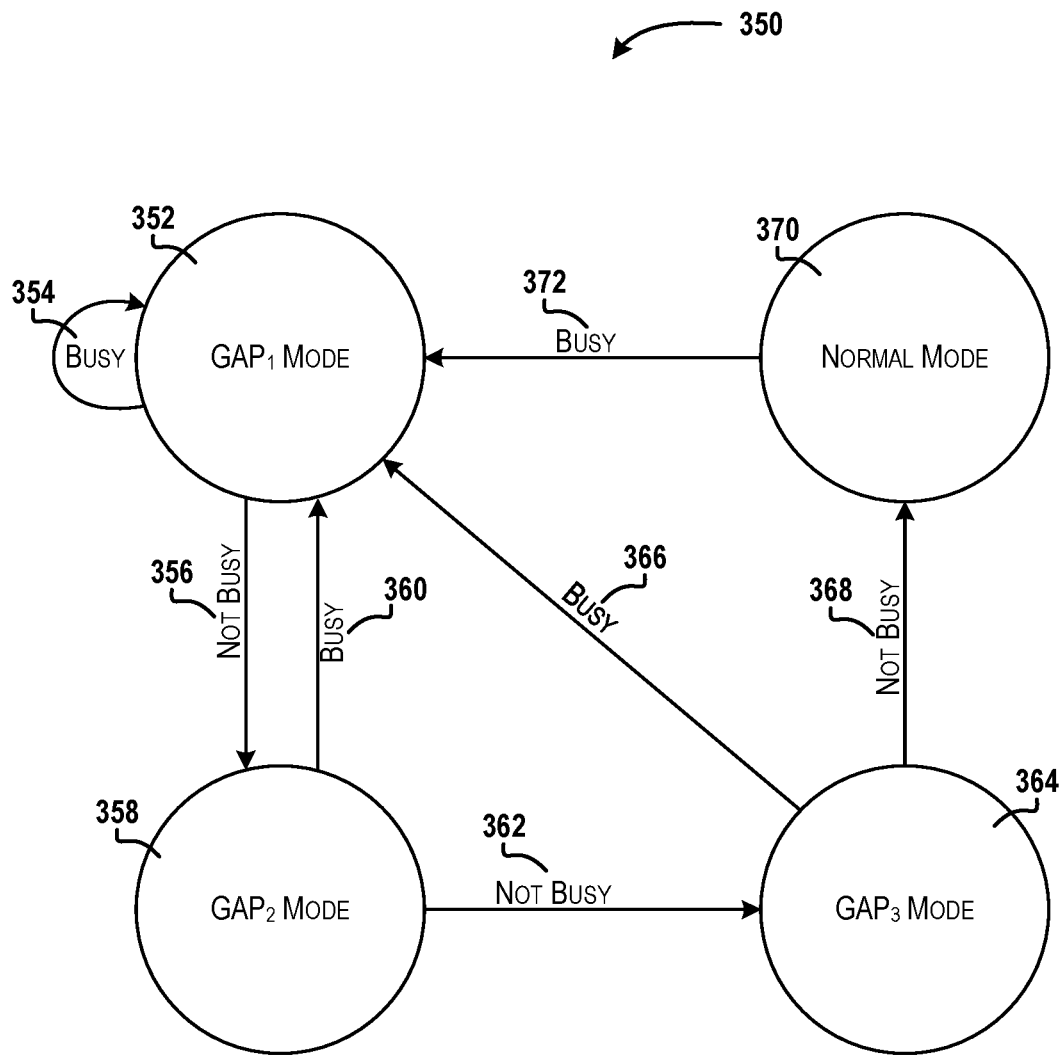
FIG. 3B is a flow diagram illustrating aspects of a state machine for congestion control through implementation of an agile transport protocol that provides various communication modes, according to an illustrative embodiment.

Turning now to FIG. 3B, with continued reference to at least FIG. 1, a state machine 350 for congestion control through implementation of the ATP is provided, according to an illustrative embodiment. The state machine 350 can provide a high-level logical flow of the ATP. In various embodiments, the ATP has an objective of satisfying demands for delivery of foreground traffic flows (e.g., the foreground traffic flow 164 of FIG. 1), while also providing fairness of resource allocation between competing background traffic flows (e.g., the background traffic flow 160 of FIG. 1). In an embodiment, the state machine 350 includes multiple gradually aggressive probing modes, such as $GAP_1$ mode 352, $GAP_2$ mode 358, and $GAP_3$ mode 364. The state machine 350 can also include a normal mode, such as normal mode 370. In various embodiments, the proxy server 150 and/or the cell site 112 can execute or otherwise implement computer executable instructions (e.g., the ATP application 154 or portions thereof, such as the $GAP$ script$_1$ 156, the $GAP$ script$_2$ 157, and the $GAP$ script$_3$ 158) to implement one or more aspects of the ATP, including any of the GAP$_1$ mode 352, the GAP$_2$ mode 358, the GAP$_3$ mode 364 and/or the normal mode 370. In various embodiments, each of the GAP modes (e.g., any of the GAP$_1$ mode 352, the GAP$_2$ mode 358, and the GAP$_3$ mode 364) can allow opportunities for scheduling foreground traffic flows, and thus prioritize delivery of foreground traffic flows over background traffic flows. During an instance of a GAP mode (e.g., any of the GAP$_1$ mode 352, the GAP$_2$ mode 358, and the GAP$_3$ mode 364), the proxy server 150 can probe for spare capacity using bursts of packets (e.g., an instance of one of the probe burst packet sets 180A-N), and then wait a defined time interval (e.g., the probe burst delay interval 182) before probing for spare capacity again. Based on estimates and determinations of communication path capacity and busyness, the proxy server 150 can activate or otherwise initiate use of the normal mode 370. In the normal mode 370, the proxy server 150 can instruct the cell site 112 that an instance of a background traffic flow (e.g., the background traffic flow 160) is delivered in an increasing manner, such as by increasing the amount of resources and throughput allocated to the background traffic flow 160 as the communication path continues to remain not busy. During normal mode 370, the proxy server 150 can continue to provide congestion avoidance by capping the maximum amount of sending rate for the background traffic flow 160 to a defined percentage of the capacity of the communication path, such as indicated by the capacity reserve factor 174. For example, in an embodiment, during normal mode 370, the background traffic flow 160 may be rate-limited to 80% of estimated available capacity, which can be represented by the communication path capacity indicator 172.

In various embodiments, the proxy server 150 can detect whether there exist other senders, whether background or foreground (e.g., background source server 136 and/or the foreground source server 132), that are competing to send a traffic flow. As such, if the proxy server 150 detects a competing sender, the proxy server 150 can exponentially back-off from delivering the background traffic flow 160, and revert to activating the GAP$_1$ mode 352. The back-off of delivering the background traffic flow 160 can occur anytime during probing for spare capacity (e.g., during one of the GAP$_1$ mode 352, the GAP$_2$ mode 358, and the GAP$_3$ mode 364) and/or during the normal mode 370 because the proxy server 150 can continually detect or otherwise determine busyness for each acknowledgement, such as any of the ACKs 167A-N.

In various embodiments, the state machine 350 may use the normal mode 370 as the most aggressive mode for sending background traffic flows 160. Because the normal mode 370 may, in some embodiments, aggressively send data, a series of three probe modes may be implemented (e.g., the GAP$_1$ mode 352, the GAP$_2$ mode 358, and the GAP$_3$ mode 364), where each of the GAP$_1$ mode 352, the GAP$_2$ mode 358, and the GAP$_3$ mode 364 has a larger burst (i.e., larger probe burst size, such as indicated by the probe burst sizes 181A-N) than the previous bursts of data packets sent during the previous mode. The increase in size of the probe bursts can increase the accuracy of capacity estimates before entering normal mode 370. During each GAP mode (e.g., any of the GAP$_1$ mode 352, the GAP$_2$ mode 358, and the GAP$_3$ mode 364), the proxy server 150 can send a burst of multiples of M packets (e.g., instances of the probe burst packet sets 180A-N) and wait for T milliseconds (e.g., indicated in the probe burst delay interval 182) to estimate capacity and busyness, which in turn may be determined by observing and utilizing acknowledgements (e.g., the ACKs 167A-N) for detecting packet inter-arrival discontinuities (e.g., instances of the packet inter-arrival discontinuity 178). If the cell site 112 is not busy, the proxy server 150 can initiate the next GAP mode (e.g., activating the GAP$_2$ mode 358 after the GAP$_1$ mode 352, and the GAP$_3$ mode 364 after the GAP$_2$ mode 358). Upon activating the next GAP mode, the proxy server 150 can increase the burst size (e.g., by sending the next larger instance from one of the probe burst packet sets 180A-N). The proxy server 150 can then wait for return of one or more instances of ACKs 167A-N. After the third GAP mode (e.g., the GAP$_3$ mode 364), the proxy server 150 can activate the normal mode 370 if no busyness is detected. If, at any point, the proxy server 150 detects or otherwise determines that another sender is present and competing for resources (and thus causing the communication path to become busy), then the proxy server 150 can revert back to the first GAP mode (e.g., the GAP$_1$ mode 352). If busyness is sensed in the GAP$_1$ mode 352, then the proxy server 150 can enter an exponential random back-off in multiples of T, such as by activating multiple instances of the probe burst delay interval 182.

As illustrated in FIG. 3B, the proxy server 150 can begin probing for spare capacity for a particular communication path (e.g., the communication path 1) at the GAP$_1$ mode 352. During the GAP$_1$ mode 352, the proxy server 150 can deliver an instance of a probe burst packet set (e.g., the probe burst packet set 180A) to the client device (e.g., the client device 102A) so as to check for capacity and busyness. If the proxy server 150 determines that the particular communication path is busy, then the busy path 354 can be followed to activate an instance of the probe burst delay interval 182. If the proxy server 150 determines that the particular communication path is not busy, then the not busy path 356 can be followed to activate the GAP$_2$ mode 358. During the GAP$_2$ mode 358, the proxy server 150 can deliver an instance of a larger probe burst packet set (e.g., the probe burst packet set 180B) so as to check for capacity and busyness. If the proxy server 150 determines that the communication path is busy, then the busy path 360 can be followed to the GAP$_1$ mode 352, where an instance of the probe burst delay interval 182 can be imposed. If the proxy server 150 determines that the communication path is not busy, then the not busy path 362 to activate the GAP$_3$ mode 364 can be followed. During the GAP$_3$ mode 364, the proxy server 150 can deliver an instance of a yet larger probe burst packet set (e.g., a probe burst packet set 180N) so as to check for capacity and busyness. If the proxy server 150 determines that the communication path is busy, then the busy path 366 can be followed to the GAP$_1$ mode 352, where multiple instances of the probe burst delay interval 182 can be imposed. If the proxy server 150 determines that the communication path is not busy, then the not busy path 368 can be followed to the normal mode 370. During the normal mode 370, the proxy server 150 can deliver the background traffic flow 160 while maintaining a reserve capacity (e.g., the reserve capacity 316). While in normal mode 370, the maximum sending rate (i.e., throughput) for the background traffic flow 160 can correspond with the background flow rate limit 318 shown in FIG. 3A. The maximum sending rate can be determined by the background flow limiter 185, which can dynamically adjust the maximum sending rate according to the communication path capacity indicator 172 and the capacity reserve factor 174. For example, if the capacity reserve factor 174 indicates that a maximum of 80% of the capacity should be used, then the background flow limiter 185 can limit the sending rate of the background traffic flow 160 to 80%. During the normal mode 370, the proxy server 150 may detect that the communication path has become busy, such as due to competition from another sender attempting to send a foreground traffic flow or another instance of a background traffic flow. As such, if the communication path becomes busy, then the busy path 372 can be followed so as to yield capacity and reactivate the $GAP_1$ mode 352. It is understood that the examples provided herein are for illustration purposes only, and therefore should not be construed as limiting in any way.

Figure 4A:
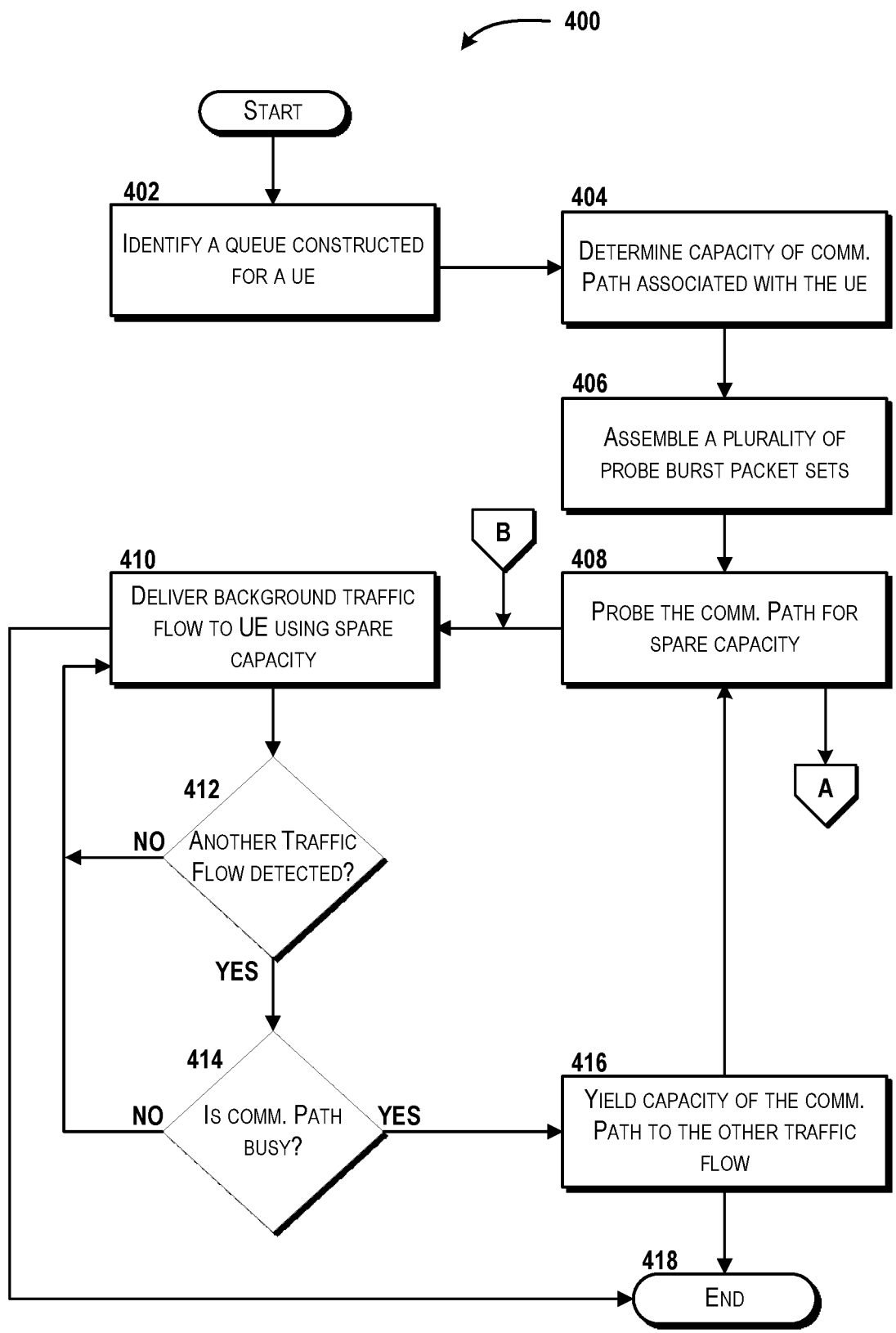
FIG. 4A provides a flow diagram illustrating aspects of a method for agile transport of background traffic flows in cellular networks, according to an illustrative embodiment.
Figure 4B:
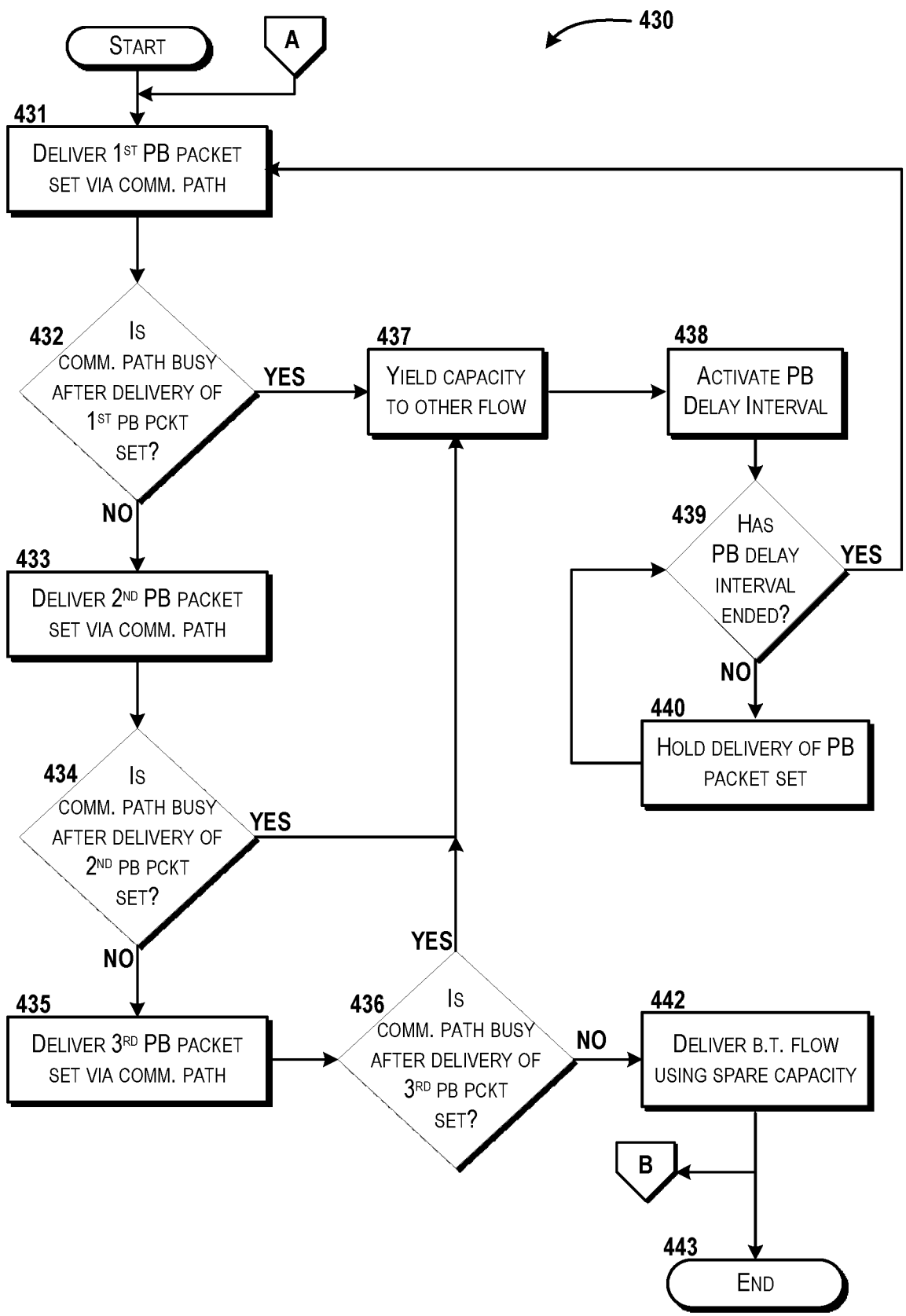
FIG. 4B provides a flow diagram illustrating aspects of a method for probing for spare capacity to facilitate agile transport of background traffic flows in cellular networks, according to another illustrative embodiment.
Figure 4C:
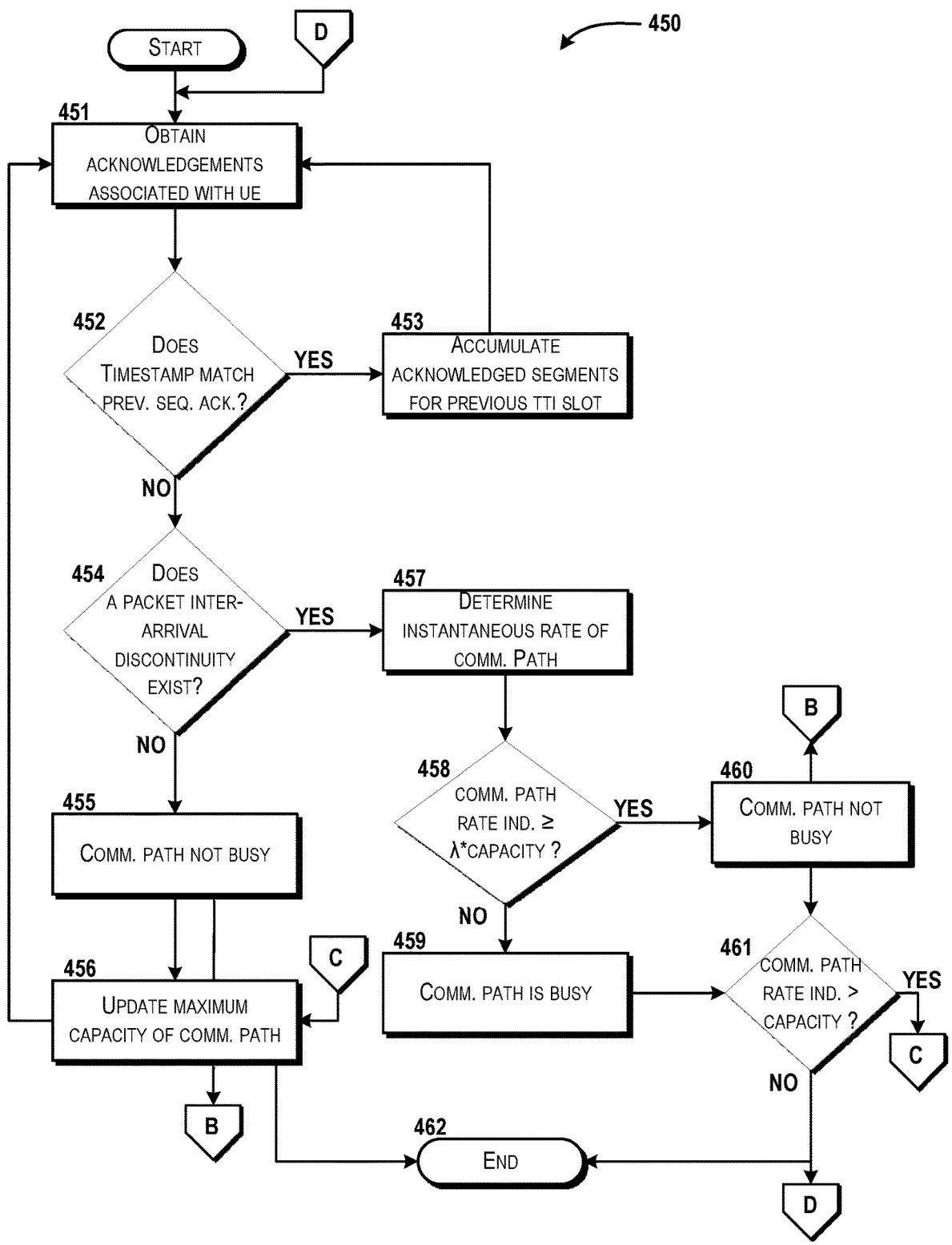
FIG. 4C is a flow diagram illustrating aspects of a method for determining busyness to facilitate agile transport of background traffic flows in cellular networks, according to an illustrative embodiment.

Turning now to FIGS. 4A, 4B, and 4C, with continued reference to FIGS. 1, 2, 3A, and 3B, aspects of methods that provide operations for implementing the ATP will be described in detail, according to illustrative embodiments. It should be understood that each of the operations of the one or more methods disclosed herein, such as method 400, method 430, and/or method 450 discussed below, are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any element within the operating environment 100, including but not limited to the proxy server 150, the core network 140, the RAN 110, and/or the cell site 112, to perform one or more operations and/or causing the processor to direct other components of the computing system or device to perform one or more of the operations.

For purposes of illustrating and describing the concepts of the present disclosure, the methods disclosed herein are described as being performed by one or more instance of the proxy server 150 and/or the cell site 112 via execution of one or more instances of computer-executable instructions (i.e., executable data processes that instruct and transform a processor) such as, for example, the ATP application 154 and portions thereof, such as the flow aware script 155, the GAP $script_1$ 156, the GAP $script_2$ 157, and/or the GAP $script_3$ 158, that configure one or more processing resources, such as the processor 151 of the proxy server 150 within the core network 140. It should be understood that additional and/or alternative devices and/or network elements can, in some embodiments, provide the functionality described herein via execution of one or more modules, applications, and/or other software including, but not limited to, the transport host platform 142 and/or other instances of the cell site 112 that may be located within and/or outside the RAN 110. Thus, the illustrated embodiments are illustrative, and should not be viewed as being limiting in any way. The methods 400, 430, and 450 will be described with reference to one or more of the FIGS. 1, 2, 3A and 3B.

Turning now to FIG. 4A, the method 400 for agile transport of background traffic flows in cellular networks is provided, according to an embodiment. The method 400 begins and can proceed to operation 402. In some embodiments, the method 400 can begin and proceed directly to operation 404. For clarity, a discussion of operation 402 will precede a discussion of operation 404. At operation 402, the proxy server 150 may identify, from a radio access network cell site, a queue that is constructed for a user equipment. For example, the proxy server 150 can access or otherwise coordinate with the PFS 114 of the cell site 112 to identify or otherwise select a particular queue that is associated with one of the client devices 102A-N, such as the queue 116A constructed for the client device 102A, and in turn is utilized by the cell site 112 to route one or more data packets to the client device 102A via the communication path 1. In some embodiments, other instances of a queue that is active on the cell site 112 may be analyzed or otherwise monitored by the PFS 114 and/or proxy server 150, such as any of the queues 116B-N. In some embodiments, the queue 116A can be used to determine a maximum sending rate capability of the communication path 1, which can be referred to as the capacity of a communication path. In some embodiments, spare capacity can occur when the cell site 112 does not utilize the communication path 1 at the maximum sending rate (e.g., delivery at a rate indicated by the communication path capacity indicator 172), and thus the instantaneous sending rate (e.g., indicated by a communication path rate indicator 173 which may be determined based on analysis of the queue 116A and acknowledgements (e.g., the ACKs 167A-N) sent from the client device 102A in response to probing for spare capacity discussed below) is below the maximum sending rate, thereby yielding a difference (i.e., sending rate differential) and thus spare capacity that may be used for delivery of background traffic flows.

At operation 404, the proxy server 150 can determine a capacity of a communication path that communicatively couples the user equipment to the radio access network cell site. The capacity of the communication path can indicate a maximum sending rate by the radio access network cell site for the communication path, such as provided by an instance of the communication path capacity indicator 172. For example, in some embodiments, the proxy server 150 can analyze the amount of data packets that were serviced by the queue 116A during a plurality of time transmission intervals, such as over the span of the TTIs 122A-N. The proxy server 150 can use the maximum number of data packets delivered during an TTI instance (e.g., the packet maximum identifier 118A during the TTI 122A) to determine a maximum throughput sending rate (i.e., capacity of the communication path), which is designated as the capacity of the communication path 1 for the client device 102A. The proxy server 150 can generate an instance of the communication path capacity indicator 172 for a particular communication path (e.g., for the communication path 1 and the queue 116A), thereby providing a maximum sending rate so that further analysis of cell site operations can determine whether spare capacity exists for delivery of background traffic flows, such as discussed below.

From operation 404, the method 400 can proceed to operation 406, where the proxy server 150 can assemble a plurality of probe burst packet sets from a background traffic flow. For example, in some embodiments, a source server, such as the background source server 136, may request that an instance of the background content package 138 be delivered to the client device 102A. In some embodiments, the background content package 138 can be delivered as an instance of the background traffic flow 160 that includes the low priority data packets 162. In some embodiments, the proxy server 150 may assemble a plurality of probe burst packet sets (e.g., the probe burst packet sets 180A-N) using data that is targeted for delivery to the client device 102A, such as the low priority data packets 162 of the background traffic flow 160 that, in an embodiment, can be targeted for delivery to the client device 102A. In some embodiments, a plurality of probe burst packet sets assembled by the proxy server 150 can include at least three sets, including a first probe burst packet set (e.g., the probe burst packet set 180A), a second probe burst packet set (e.g., the probe burst packet set 180B), and a third probe burst packet set (e.g., the probe burst packet set 180C). Each probe burst packet set can be larger in size than the next, such as the third probe burst packet set being larger in size than the second probe burst packet set, and the second probe burst packet set being larger in size than the first probe burst packet set. As such, the data size indicated by the probe burst size 181A-N can enable bursts of data in increasingly larger sizes for each of the probe burst packet sets 180A-N.

From operation 406, the method 400 can proceed to operation 408, where the proxy server 150 can probe the communication path for spare capacity using the plurality of probe burst packet sets. For example, the proxy server 150 can instruct the PFS 114 of the cell site 112 to add the first probe burst packet set to the queue 116A for delivery to the client device 102A. The proxy server 150 can wait for a response from the client device 102A which provides instances of an acknowledgement (e.g., the ACKs 167A-N) in response to deliver of the first probe burst packet set. In various embodiments, the proxy server 150 may intercept or otherwise obtain the ACKs 167A-N via the cell site 112, where one or more of the ACKs 167A-N from the client device 102A may be directed to the background source server 136. The proxy server 150 can detect spare capacity by analyzing the busyness of the communication path, specifically by detecting the existence of a packet inter-arrival discontinuity. Multiple iterations of delivering the second and third probe burst packet sets, along with analysis of acknowledgements after each delivery to detect spare capacity, is discussed in further detail with respect to the method 430 illustrated in FIG. 4B. As such, in some embodiments, the method 400 can proceed to one or more operations discussed with respect to FIG. 4B.

From operation 408, the method 400 can proceed to operation 410, where the proxy server 150 can deliver the background traffic flow to the user equipment using the spare capacity while the communication path is not busy. For example, in various embodiments, in response to determining that the communication path is not busy, and thus spare capacity is available, the proxy server 150 can deliver an instance of the background traffic flow 160, which includes instances of the low priority data packets 162 from the background content package 138. In some embodiments, the proxy server 150 can instruct the PFS 114 to rate-limit the delivery of the background traffic flow 160 such that a reserve capacity (e.g., indicated as the reserve capacity 316 of FIG. 2 and/or provided by the capacity reserve factor 174 of FIG. 1) of the communication path 1 is maintained. The proxy server 150 can continue to deliver the background traffic flow using only spare capacity until the low priority data packets 162 no longer remain in the queue 116A. In some embodiments, from operation 410, the method 400 can proceed to operation 418, where the method 400 may end. In some embodiments, one or more operations of the method 400 can occur concurrent with other operations discussed herein. For example, in some embodiments, one or more of the operations 412 and/or 414 can occur while the proxy server 150 performs operation 410 for delivery of the background traffic flow 160. It is understood that the examples discussed herein are for illustration purposes only, and therefore should not be construed as limiting in any way.

In some embodiments, from operation 410, the method 400 can proceed to operation 412, where the proxy server 150 can detect whether bursts of another traffic flow, such as a foreground traffic flow or another background traffic flow, are being sent (and/or attempting to be sent) concurrently along the communication path while the background traffic flow is currently being delivered. For example, in an embodiment, if a first instance of the background traffic flow 160 is being delivered to the client device 102A via the communication path 1, the proxy server 150 can monitor and detect whether an instance of the foreground traffic flow 164 and/or another instance of a background traffic flow (possibly from another background source server) is attempting to be delivered via the communication path 1 while the background traffic flow 160 is currently being delivered to the background application 106 using spare capacity. In some embodiments, another traffic flow may be detected based on a fluctuation in the communication path rate indicator 173 that is associated with delivery of the background traffic flow 160 via the communication path 1. In some embodiments, the proxy server 150 can detect competition for use of the communication path 1 (and thus the presence of another traffic flow) based on the existence of a packet inter-arrival discontinuity (e.g., the packet inter-arrival discontinuity 178), which is identified from instances of the ACKs 167A-N which can be generated by the client device 102A in response to delivery of one or more of the low priority data packets 162 of the background traffic flow 160.

In some embodiments, if another traffic flow (e.g., a foreground traffic flow and/or another background traffic flow) is not detected, the method 400 can proceed along the NO path to operation 410, where delivery of the background traffic flow can continue. In some embodiments, if another a traffic flow (e.g., a foreground traffic flow and/or another background traffic flow) is detected, the method 400 can proceed along the YES path to operation 414.

At operation 414, the proxy server 150 can determine whether the communication path is busy. For example, in an embodiment, the proxy server 150 may have detected in operation 412 that bursts of foreground data packets 166 from the foreground traffic flow 164 are being delivered concurrent to the delivery of the background traffic flow 160. For example, in an embodiment, the proxy server 150 may compare the instantaneous sending rate (e.g., provided by the communication path rate indicator 173) to a busyness threshold (e.g., indicated by the busyness threshold value 177). If the communication path rate indicator 173 falls below the busyness threshold (thereby indicating that the sending rate at which traffic along the communication path is being delivered is not close to the maximum capacity for sending rate), then the proxy server 150 can infer or otherwise determine that the communication path 1 is busy. If the communication path 1 is considered to be busy, then the background traffic flow 160 may no longer be utilizing spare capacity, but rather may be consuming PRBs 120 that could otherwise be allocated to delay-intolerant, time-sensitive data packets, such as the foreground data packets 166 of the foreground traffic flow 164 that is targeted for delivery to the foreground application 104 of the client device 102A. In various embodiments, if the proxy server 150 determines that the communication path in use to deliver the background traffic flow 160 is (or continues to remain) not busy, the method 400 can proceed along the NO path to operation 410, where delivery of the background traffic flow 160 can continue. In embodiments where the proxy server 150 determines that the communication path in use to deliver the background traffic flow 160 is (or becomes) busy, the method 400 can proceed along the YES path to operation 416.

In response to determining that the communication path is busy, the method 400 can implement operation 416, where the proxy server 150 can yield the capacity of the communication path 1 (that was being consumed or otherwise used by the background traffic flow 160) to the other one or more foreground traffic flows detected, such as one or more instances of the foreground traffic flow 164. In some embodiments, yielding capacity to foreground traffic flows can be provided by the proxy server 150 instructing the PFS 114 to isolate and hold instances of the low priority data packets 162 that are in the queue 116A awaiting delivery as part of the background traffic flow 160 to the client device 102A via the communication path 1. The proxy server 150 can, via the PFS 114, reassign any PRBs 120 to one or more instances of foreground data packets 166 of the foreground traffic flow 164, which in turn causes an exponential back-off of resource utilization by the background traffic flow 160 at the cell site 112. In some embodiments, when delivery of the background traffic flow 160 is yielded to the foreground traffic flow 164, the proxy server 150 can activate one or more instances of the probe burst delay interval 182 so that the proxy server 150 waits a defined time interval before further probing for space capacity.

In some embodiments, from operation 416, the method 400 can proceed to operation 408, where the proxy server 150 can continue to probe for spare capacity. In some embodiments, from operation 406, the method 400 can proceed to operation 418, where the method 400 can end.

Turning now to FIG. 4B, the method 430 for implementing aspects of an agile transport protocol for delivering background traffic flows in cellular networks is provided, according to an illustrated embodiment. In some embodiments, one or more operations from the method 400 and/or the method 450 may occur prior to the start of the method 430. It is understood that the examples discussed herein are for illustration purposes only, and therefore should not be construed as limiting.

The method 430 can begin and proceed to operation 431, where the proxy server 150 can deliver, via the communication path, the first probe burst packet set to the user equipment. For example, the proxy server 150 can provide the probe burst packet set 180A to the queue 116A for scheduling and delivery to the client device 102A via the communication path 1. In various embodiments, the first probe burst packet set may be one instance among a plurality of instances of probe burst packet sets, such as one instance among the probe burst packet sets 180A-N. As such, in some embodiments, the first instance of probe burst packet set that is delivered to the client device 102A may have the smallest data size of the plurality so as to maintain operating efficiency of the cell site 112 in the event that one or more other traffic flow are being (or attempting to be) delivered via the same communication path, such as the communication path 1. In various embodiments, the data size of the probe burst packet set may be adjusted or otherwise configured based on the amount of data packets included therein, such as the number of low priority data packets 162 may, in some embodiments, be used to populate the one or more instances of the probe burst packet sets 180A-N.

In some embodiments, the plurality of probe burst packet sets can include a first probe burst packet set, a second probe burst packet set, and a third probe burst packet set. In some embodiments, the third probe burst packet set can be larger in size than the second probe burst packet set, and the second probe burst packet set can be larger in size than the first probe burst packet set.

From operation 431, the method 430 can proceed to operation 432, where the proxy server 150 can determine whether the communication path which delivered the first probe burst packet set is busy. For example, by delivering the probe burst packet set 180A to the client device 102A, the client device 102A is triggered to generate acknowledgements in response, such as one or more of the ACKs 167A-N. Therefore, in various embodiments, the proxy server 150 can determine whether the communication path at issue (e.g., the communication path 1) is busy based on analysis of the ACKs 167A-N. Specifically, in some embodiments, if the proxy server 150 determines that a packet inter-arrival discontinuity exists and/or that the instantaneous sending rate of the communication path 1 (e.g., indicated by the communication path rate indicator 173) falls below the busyness threshold (e.g., indicated by the busyness threshold value 177), then the communication path would be designed or otherwise determined to be busy. If the communication path is busy, the method 430 can proceed along the YES path to operation 437, which will be discussed below in further detail. In some embodiments, the proxy server 150 can determine that the communication path is not busy based on the instantaneous sending rate falling below the busyness threshold and/or a lack of a packet inter-arrival discontinuity existing in the acknowledgements (e.g., a lack of the packet inter-arrival discontinuity 178 among the ACKs 167A-N) received in response or otherwise after delivery of the first probe burst packet set, such as the probe burst packet set 180A). In various embodiments, if the communication path is not busy after delivery of the first probe burst packet set, the method 430 can continue along the NO path to operation 433.

At operation 433, the proxy server 150 can deliver the second probe burst packet set, which in some embodiments, can have a larger data size than the first probe burst packet set. For example, in some embodiments, the proxy server 150 can deliver the probe burst packet set 180B to the client device 102A via the communication path 1. In some embodiments, the probe burst packet set 180 can be configured to have a data size that is at least twice as large as the first probe burst packet set.

From operation 433, the method 430 can proceed to operation 434, where the proxy server 150 can determine whether the communication path is busy, or remains not busy, after delivery of the second probe burst packet set. For example, in response to delivering the probe burst packet set 180B, the proxy server 150 may intercept, receive, or otherwise obtain the acknowledgements that were generated by the client device 102A upon receipt of the data packets of the probe burst packet set 180B. The proxy server 150 can analyze the instantaneous sending rate (e.g., indicated by the communication path rate indicator 173) during delivery of the second probe burst packet set 180B to determine its relation to the busyness threshold. If the communication path is busy, then the method 430 can proceed along the YES path to operation 437, which will be discussed below. The proxy server 150 can determine whether a packet inter-arrival discontinuity exists based on the acknowledgements received from the client device. Based on the instantaneous sending rate and the lack of packet inter-arrival discontinuities from the client device 102A after delivery of the second probe burst packet set, the proxy server 150 can confirm that the communication path is not busy. If the communication path is not busy, then the method 430 can proceed along the NO path to operation 435.

At operation 435, the proxy server 150 can deliver, via the communication path, the third burst packet set to the user equipment. For example, the proxy server 150 can deliver the probe burst packet set 180C to the client device 102A via the communication path 1. The third probe burst packet set may be larger than the first and second probe burst packet set. In some embodiments, the third probe burst packet set may be at least twice as large as the second probe burst, and may be at least four times as large as the first probe burst packet set. As such, subsequent instances of a probe burst packet set after the first probe burst packet set may be exponentially larger than the first probe burst packet set.

From operation 435, the method 430 can proceed to operation 436, where the proxy server 150 can determine whether the communication path is busy or continues to remain not busy. For example, in some embodiments, the proxy server 150 may analyze acknowledgements received from the client device 102A after delivery of the third probe burst packet set (e.g., the probe burst packet set 180C). As such, in some embodiments, the communication path can be designated as not busy based on the lack of a packet inter-arrival discontinuity after delivery of the third probe burst packet set and/or the instantaneous sending rate not falling below the busyness threshold. If the instantaneous sending rate (e.g., provided by the communication path rate indicator 173) falls below the busyness threshold (e.g., provided by the busyness threshold value 177) and/or a packet inter-arrival discontinuity is detected, the proxy server 150 may designate the communication path as being busy. If the communication path is busy, the method 430 can continue along the YES path to operation 437, which will be discussed in further detail below. If the communication path continues to remain not busy, the method 430 can proceed along the NO path to operation 442. For clarity purposes, a discussion of operations proceeding along the YES path to operation 437 will be discussed first, followed by a discussion of operations proceeding along the NO path to operation 442.

It is understood that although three iterations of probe burst packet set delivery are illustrated in FIG. 4B, alternate embodiments may include less than three or more than three iterations of delivering a probe burst packet set and confirming whether the communication path is busy or not. As such, in some embodiments, each probe burst packet set that is delivered as part of a succession of probe burst packet sets (e.g., during various GAP modes discussed herein) can be exponentially larger in data size than a previous probe burst packet set delivered. It is understood that the examples provided are for illustration purposes only, and therefore should not be limiting in any way.

At operation 437, the proxy server 150 can yield capacity to another flow that is being sent concurrently along the communication path 1. In various embodiments, yielding capacity to another flow can include instructing the proportional fair scheduler 114 to release any resources that were allocated or otherwise dedicated to the delivery of the background traffic flow 160 (e.g., releasing one or more, or all, PRBs 120 that were allocated to the queue 116A and the communication path 1) and redirect allocation of resources (e.g., one or more of the PRBs 120) to another flow, which may be a foreground traffic flow (e.g., the foreground traffic flow 164). In some embodiments, yielding capacity can occur at an exponential rate such that within a defined number of TTIs (e.g., one TTI instance, such as the TTI 122A), the background traffic flow 160 is no longer being delivered to the client device 102A via the communication path 1. As such, yielding capacity to another flow enables concurrently delivery of the foreground traffic flow 164 while delivery of the background traffic flow 160 is halted. In some embodiments, the operation 437 may include or otherwise be performed substantially similar to the operation 416 discussed above, and the operation 416 may include aspects of the operation 437. In various embodiments, from operation 437, the method 430 can proceed to operation 438, where the proxy server 150 can activate an instance of the probe burst delay interval 182. The probe burst delay interval 182 can define an amount of time that the proxy server 150 should wait before reinitiating gradually aggressive probing for spare capacity. From operation 438, the method 430 can proceed to operation 439, where the proxy server 150 can determine whether the probe burst delay interval 182 has ended. If the time of the probe burst delay interval 182 has elapsed, the method 430 can proceed along the YES path to operation 431. If the time of the probe burst delay interval 182 has not ended or otherwise elapsed, the method 430 can proceed along the NO path to operation 440, where the proxy server 150 can instruct the PFS 114 of the cell site 112 to hold delivery of data packets to the client device 102A, such as data packets that are part of the probe burst packet set 180A. In some embodiments, the method 430 may proceed from operation 440 to operation 439 discussed above.

Returning to operation 436, if the proxy server determines that the communication path continues to remain not busy, the method 430 can proceed to operation 442, where the proxy server 150 can deliver the background traffic flow 160 to the client device 102A using spare capacity of the communication path 1. In some embodiments, from operation 442, the method 430 can proceed to one or more operations discussed with respect to FIG. 4A, such as the operation 410. In some embodiments, the method 430 can proceed from operation 442 to operation 443, where the method 430 can end.

Turning now to FIG. 4C, a method 450 related to aspects of an agile transport protocol for handling background traffic flows in a cellular network is provided, according to an illustrated embodiment. In some embodiments, the method 450 can proceed from any of the operations discussed above with respect to the method 400 and/or the method 430. In some embodiments, one or more operations of the method 400 can occur prior to one or more operations of the method 450 discussed above. It should be understood that the examples provided are for illustration purposes only, and therefore should not be construed as limiting in any way.

The method 450 can begin and proceed to operation 451, where the proxy server 150 can obtain acknowledgements associated with a user equipment. For example, in response to delivering one or more data packets to the client device 102A, such as part of the probe burst packet set 180A, the client device 102A may generate instances of the ACKs 167A-N that each provide a sequence number and a received timestamp, such as the sequence numbers 169A-N and the received timestamps 168A-N, respectively.

From operation 451, the method 450 may proceed to operation 452, where the proxy server 150 can determine whether two acknowledgements are sequential and share the same received timestamp. For example, the proxy server 150 can analyze the sequence numbers 169A-N of the ACKs 167A-N, and for the acknowledgements that are in sequence, the proxy server 150 can analyze whether the corresponding received timestamps 168A-N are the same. If the received timestamps 168A-N are the same, that means that the two sequential acknowledgments belong to the same TTI. If the proxy server 150 determines that two sequential acknowledgements have the same received timestamp, then the method 450 can proceed along the YES path to operation 453, where the proxy server 150 can accumulate each of the acknowledgements that share a received timestamp for the previous TTI slot, such as one of the TTI slots 124A-N. From operation 453, the method 450 may proceed to operation 451 discussed above.

Returning to operation 452, if proxy server 150 determines that sequential acknowledgements do not indicate the same time on the received timestamp, then the method 450 may proceed along the NO path to operation 454, where the proxy server 150 can determine whether a packet inter-arrival discontinuity exists. Specifically, the proxy server 150 can determine that a packet inter-arrival discontinuity exists when, for sequential acknowledgements, the received timestamps differ by more than one TTI, such as more than one TTI 122A. Therefore, when the acknowledgements (e.g., sequential acknowledgements within the ACKs 167A-N) have received timestamps that either do not differ or differ by one TTI or less than one TTI, the proxy server 150 determines that there is a lack of a packet inter-arrival discontinuity because a packet inter-arrival discontinuity does not exist within the acknowledgements. Stated differently, a lack of a packet inter-arrival discontinuity can indicate that to a packet inter-arrival discontinuity not existing within acknowledgements from the user equipment (e.g., the client device 102A). If a packet inter-arrival discontinuity does not exist (i.e., the acknowledgements lack indication of a packet inter-arrival discontinuity based on the received timestamps differing by one TTI or less), then the method 450 may proceed along the NO path to operation 455, where the proxy server 150 designates the communication path (e.g., the communication path 1) as being not busy. From operation 455, the method 450 can proceed to operation 456, where the proxy server 150 may update the indication of maximum capacity of the communication path, such as updating the communication path rate indicator 173 corresponding to the communication path 1. In some embodiments, the method 450 may proceed from operation 456 to operation 451 discussed above. In some embodiments, the method 450 may proceed from operation 456 to one or more operations discussed with respect to FIG. 4A, such as operation 410. In some embodiments, the method 450 may proceed from operation 456 to operation 462, where the method 450 may end.

Returning to operation 454, if a packet inter-arrival discontinuity exists based on the received timestamps differing by more than one TTI, then the method 450 may proceed along the YES path to operation 457, where the proxy server 150 can determine a maximum capacity of the communication path, such as provided by generating an instance of the communication path rate indicator 173 based on ACKs 167A-N received from the client device 102A. The communication path rate indicator 173 can provide the number of data packets per TTI that are serviced by the cell site 112, thereby indicating the instantaneous sending rate of the particular communication path.

From operation 457, the method 450 can proceed to operation 458, where the proxy server 150 can determine whether the communication path is busy. For example, in an embodiment the proxy server 150 may determine whether the communication path rate indicator 173 is greater than a busyness threshold, such as the busyness threshold value 177. In some embodiments, the busyness threshold value 177 may be generated based on a combination of the busyness threshold factor 175 and the communication path capacity indicator 172. If the communication path rate indicator 173 is greater than the busyness threshold value 177, then the instantaneous sending rate has not fallen below the busyness threshold value 177, and thus the data packets are being sent closer to a maximum capacity rate. As such, if the communication path rate indicator 173 is greater than (or in some embodiments equal to) the busyness threshold value 177, then the method 450 may proceed along the YES path to operation 460, where the proxy server 150 can designate the communication path as not busy. In some embodiments, from operation 460, the method 450 may proceed to one or more operation discussed with respect to FIG. 4A, such as operation 410. Returning to operation 458, if the communication path rate indicator 173 is less than the busyness threshold value 177, then the method 450 may proceed along the NO path to operation 459, where the proxy server 150 can designate the communication as busy.

From either operation 459 or operation 460, the method 450 can proceed to operation 461, where the proxy server 150 can determine whether the instantaneous sending rate is greater than the maximum capacity rate. For example, the proxy server 150 can compare the communication path capacity indicator 172 (representing the maximum capacity sending rate) to the communication path rate indicator 173 (representing the instantaneous sending rate). If the communication path rate indicator 173 is greater than the communication path capacity indicator 172, then the communication path capacity indicator 172 no longer represents the maximum capacity of the communication path, and therefore, the method 450 can proceed along the YES path to operation 456, where the maximum capacity of the communication path can be updated, such as by updating the communication path capacity indicator 172 with the currently determined maximum capacity rate value. If the communication path rate indicator 173 is not greater than the communication path capacity indicator 172, then the communication path capacity indicator 172 can still be used to represent maximum capacity of the communication path, and therefore, the method 450 can proceed along the NO path. In some embodiments, the method 450 may proceed along the NO path to operation 451 discussed above. In some embodiments, the method 450 may proceed along the NO to operation 462, where the method 450 may end.

Figure 5:
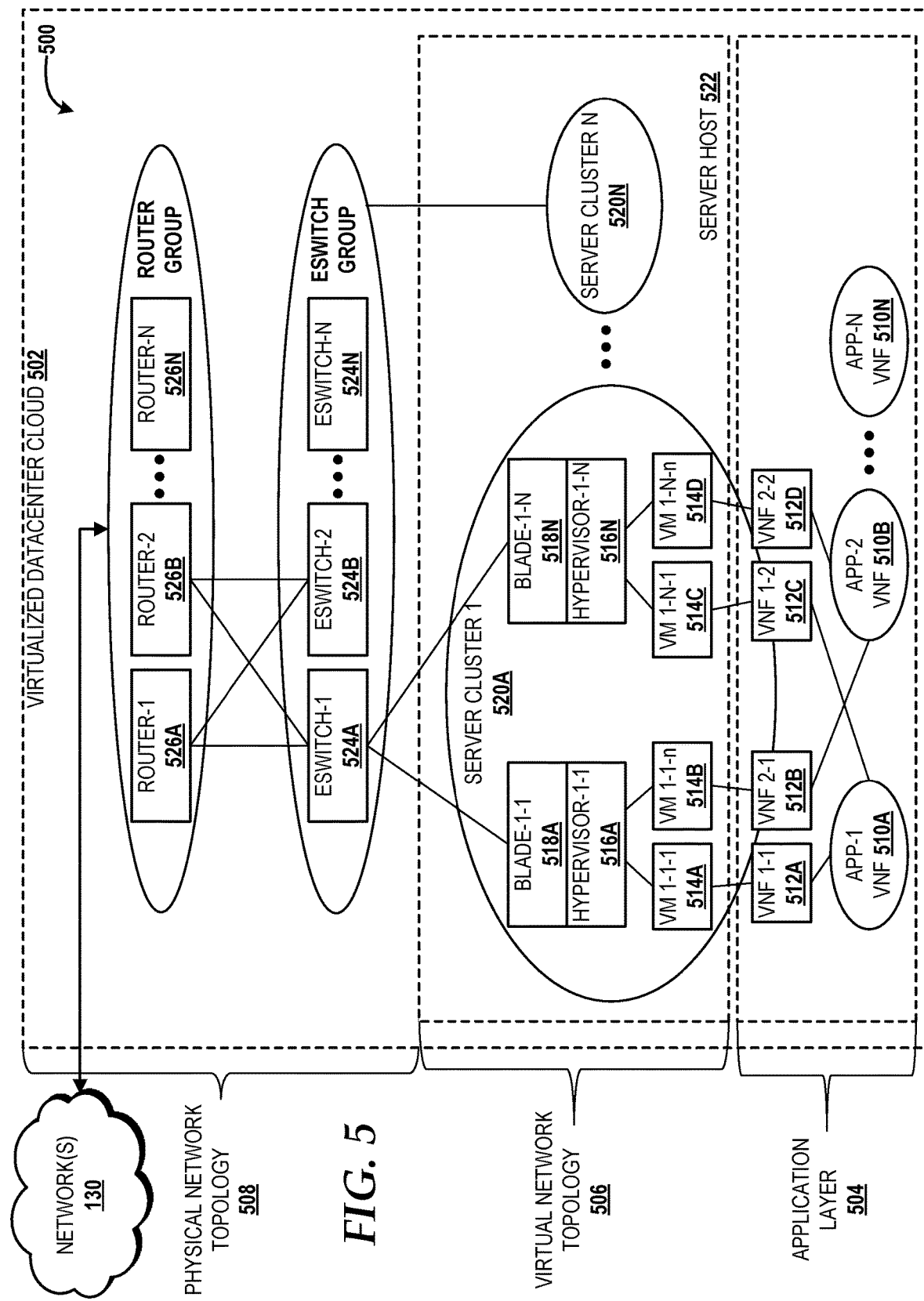
FIG. 5 is a diagram illustrating a network topology for a virtualized datacenter cloud capable of implementing aspects of the concepts and technologies described herein according to embodiments of the present disclosure.

Turning now to FIG. 5, a network topology 500 for a virtualized datacenter cloud 502 will be described, according to an illustrative embodiment. In some embodiments, at least a portion of the core network 140 and/or the RAN 110 can be configured according embodiments of the network topology 500. The illustrated network topology 500 includes three layers: an application ("APP") layer 504, a virtual network topology layer 506, and a physical network topology layer 508. The APP layer 504 can include one or more application virtualized network function ("VNFs") 510A-510N, each of which can be divided into one or more sub-VNFs 512A-512D (referred to herein collectively as sub-VNFs 512) to be executed by one or more VMs 514A-514D (referred to herein collectively as VMs 514), such as, in some embodiments, one or more of the worker processing threads 154A-N. In context of the concepts and technologies disclosed herein, the VNFs 510A-510N can include virtual processing network functions for one or more of the proxy server 150, the evolved packet core 144, and/or the New Radio core 146.

The virtual network topology layer 506 includes the VMs 514, one or more hypervisors 516A-516N (referred to herein collectively as "hypervisors 516"), and one or more server modules ("blades") 518A-518N (referred to herein collectively as "blades 518"). Each blade 518 can support one hypervisor 516 that, in turn, can manage one or more of the VMs 514. The blades 518 provide computing capacity to support the VMs 514 carrying the sub-VNFs 512. The hypervisors 516 provide resource management among the VMs 514 supported thereby. A logical server cluster 520A is created for resource allocation and reallocation purposes, which includes the blades 518 in the same instance of the server host 522. Each instance of the server host 522 can includes one or more of a logical server cluster, such as any instance of logical server clusters 520A-N (referred to collectively as "logical server clusters 520"). In some embodiments, one or more instances of the foreground source server 132, the background source server 136, the proxy server, the transport host platform 142, and/or the cell site 112 may operate, at least in part, via execution of one of the logical server clusters 520.

The physical network topology layer 508 includes an Ethernet switch ("ESwitch") group, including one or more ESwitches 524A-524N (referred to herein collectively as "ESwitches 524"). The physical network topology layer 508 also includes a router group, including one or more routers 526A-526N (referred to herein collectively as "routers 526"). The ESwitch group provides traffic switching function among the blades 518. The router group provides connectivity for traffic routing between the virtualized datacenter cloud 502 and the network 130. The routers 526 may or may not provide multiplexing functions, depending upon network design. The routers 526 may provide communicative coupling to communication components that provide wireless communication functionality. In some embodiments, the physical network topology layer 508 can correspond with one or more instances of the proxy server 150, the transport host platform 142, the foreground source server 132, the background source server 136, and/or the cell site 122.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blades 518 that hosts the VM 514 can be determined. In some embodiments, the proportional fair scheduler 114, the ATP application 154, the PGW/SGW 145, and/or the SMF/UPF 147 can operate within the virtual network topology layer 506.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitches 524 and the network(s) 130 (and/or in some instances the RAN 110 and/or the core network 140) can be performed via the routers 526. In this example, the VM 1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of a cloud software defined network ("SDN"). The association of application, VM, and blade host in this example is the VNF 1-1 512A is executed on the VM 1-1-1 514A hosted by the blade 1-1 518A in the server cluster 1 520A. In some embodiments, one or more instances of the proportional fair scheduler 114, the ATP application 154, the flow aware script 155, the GAP script$_1$ 156, the GAP script$_2$ 157, and/or the GAP script$_3$ 158 can operate within or otherwise correspond with the APP layer 504.

Figure 6:
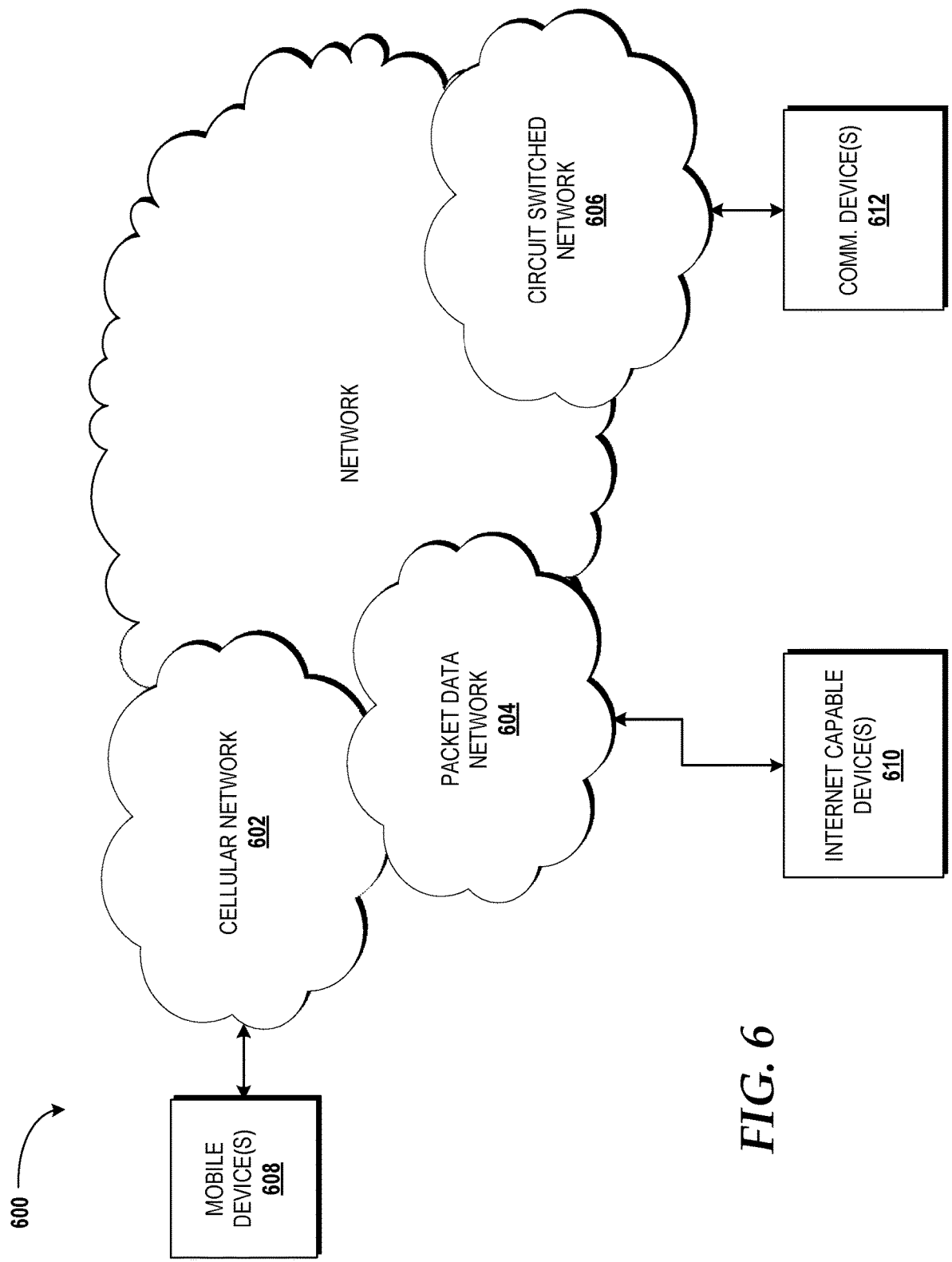
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 130, the core network 140, and/or the network 818 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMES, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, network 130, the RAN 110, and/or the core network 140 of FIG. 1 can operate, at least in part, as the cellular network 602, the packet data network 604, and/or in cooperation with one or more of the cellular network 602 and the packet data network 604.

The mobile communications device 608, such as, for example, a user equipment, a cellular telephone, a mobile terminal, a PDA, a laptop computer, a handheld computer, a tablet, a vehicle head unit, a wearable smart device, and combinations thereof, can be operatively connected to the cellular network 602. In some embodiments, any of the client devices 102A-N can be configured as the mobile communications device 608. In some embodiments, the cellular network 602 can be configured to support a 2G GSM network and can provide data communications via GPRS and/or EDGE. Additionally, or alternatively, the cellular network 602 can be configured support a 3G UMTS network and can provide data communications via the HSPA protocol family, for example, HSDPA, EUL (also referred to as HSDPA), and HSPA+. The cellular network 602 can be configured to support 4G mobile communications standards such as LTE, or the like, as well as evolved and future mobile standards, including but not limited to LTE-Advanced, LTE-Advanced Pro. The cellular network 602 can be configured to support 5G and New Radio mobile standards, as well as future mobile standards. It is understood that, in some embodiments, at least a portion of the cellular network 602 may be support by one or more virtual network functions from virtualized network infrastructure, such as instances of the virtualized datacenter cloud 502 discussed with respect to FIG. 5. In some embodiments, the cellular network 602, or a portion thereof, may be virtualized, such as a virtualized radio access network ("vRAN").

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, a client device, or the like. Typically, the requesting device includes software (e.g., an application configured as a "browser") for executing a web page in a format readable by the browser or other software such as executable applications. The software may be configured as a standalone application and/or script. Other files and/or data may be accessible via "links" and/or pointers in the retrieved files, as is understood by one of skill in the technology. In some embodiments, the packet data network 604 includes or is in communication with the Internet. In some embodiments, the at least some of the network 130, the core network 140, and/or the RAN 110 can be configured as a packet data network, such as the packet data network 604. The packet data network 604 may provide a software defined network. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are understood by one of skill in the technology and therefore will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, IoT devices, smart devices, or another suitable device, can communicate with one or more cellular networks 602, and devices connected thereto, through the packet data network 604. In some embodiments, the internet-capable devices 610 can include one or more client devices 102A-N. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the RAN 110, the core network 140, and/or the network 130 can be performed, at least in part, by the cellular network 602, the packet data network 604, and/or the circuit switched network 606, alone or in combination with other networks, network elements, and the like, according at least to aspects of the features and operations discussed herein.

Figure 7:
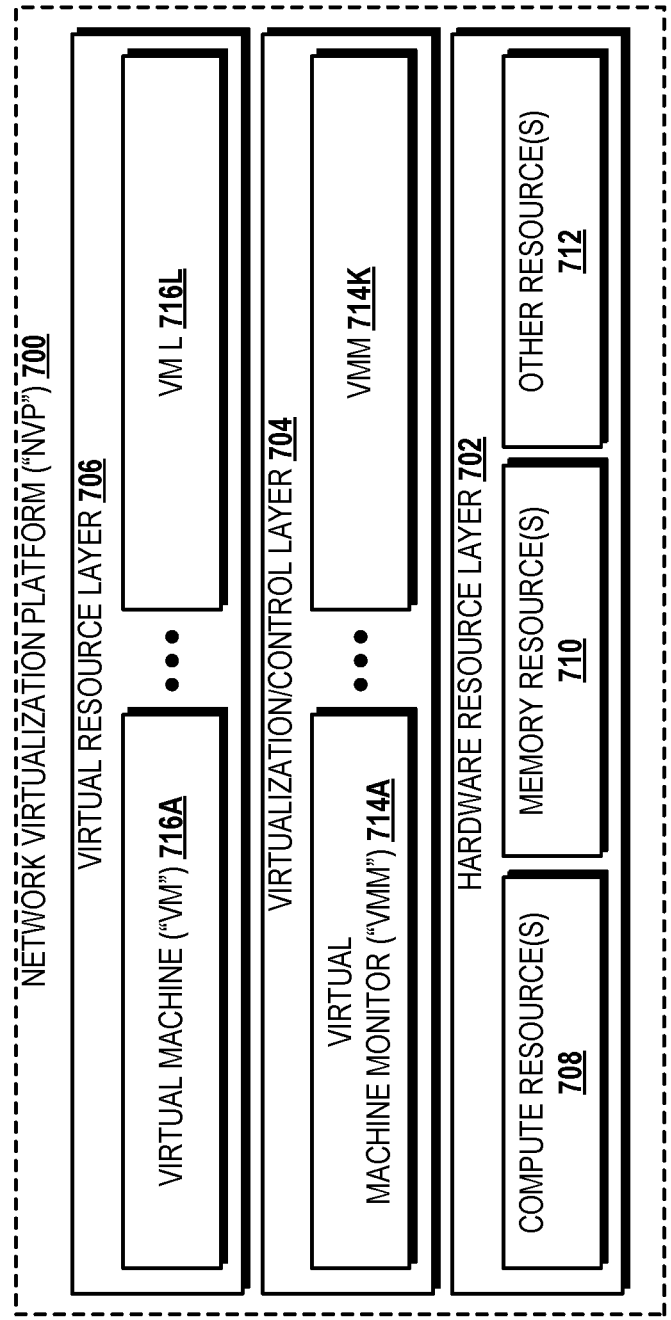
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the core network 140, the transport host platform 142, and/or at least a portion thereof, introduced above in FIG. 1 will be described, according to an illustrative embodiment. For example, in some embodiments, the proxy server 150, the transport host platform 142, the processor 151, the memory 152, the evolved packet core 144, the PGW/SGW 145, the New Radio core 146, the SMF/UPF 147 and/or other network elements of the core network 140 can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resources 710, and one or more other resources 712. In some embodiments, the hardware resource layer 702 can correspond with an embodiment of the proxy server 150 and/or the transport host platform 142 of the core network 140. In some embodiments, the hardware resource layer 702 can provide one or more instances of the PRB 120 of the cell site 112.

The compute resource(s) 708 can include one or more hardware components that perform computations to process data, and/or to execute computer-executable instructions of one or more application programs, operating systems, and/or other software, to provide, at least in part, any services or composition of services described herein. In some embodiments, the processor 151 can correspond with the compute resources 708. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the memory 152 can correspond with the memory resources 710. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708. In the claims, any use of the memory resources 710 do not include, and should not be construed or interpreted as including or covering waves, signals per se, and/or communication media.

The other resource(s) 712 can include any other hardware resources that can be utilized by the compute resource(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter, collectively "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706. In some embodiments, the transport host platform 142, the proxy server 150, the core network 140, and/or the RAN 110 can provide the VMMs 714.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm of networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception. In the illustrated embodiment, the virtual resource layer 706 includes VMs 716A-716L (hereinafter, collectively "VMs 716"). The VMs 716 can execute instructions to provide, at least in part, any services or composition of services and/or operations described herein, such as but not limited to, the proportional fair scheduler 114, the ATP application 154, the flow aware script 155, the GAP script$_1$ 156, the GAP script$_2$ 157, and/or the GAP script$_3$ 158. In some embodiments, at least one or more of the proxy server 150 executing the flow aware script 155, the GAP script$_1$ 156, the GAP script$_2$ 157, and/or the GAP script$_3$ 158 can be configured to operate as one or more of the VMs 716 within the operating environment 100.

Figure 8:
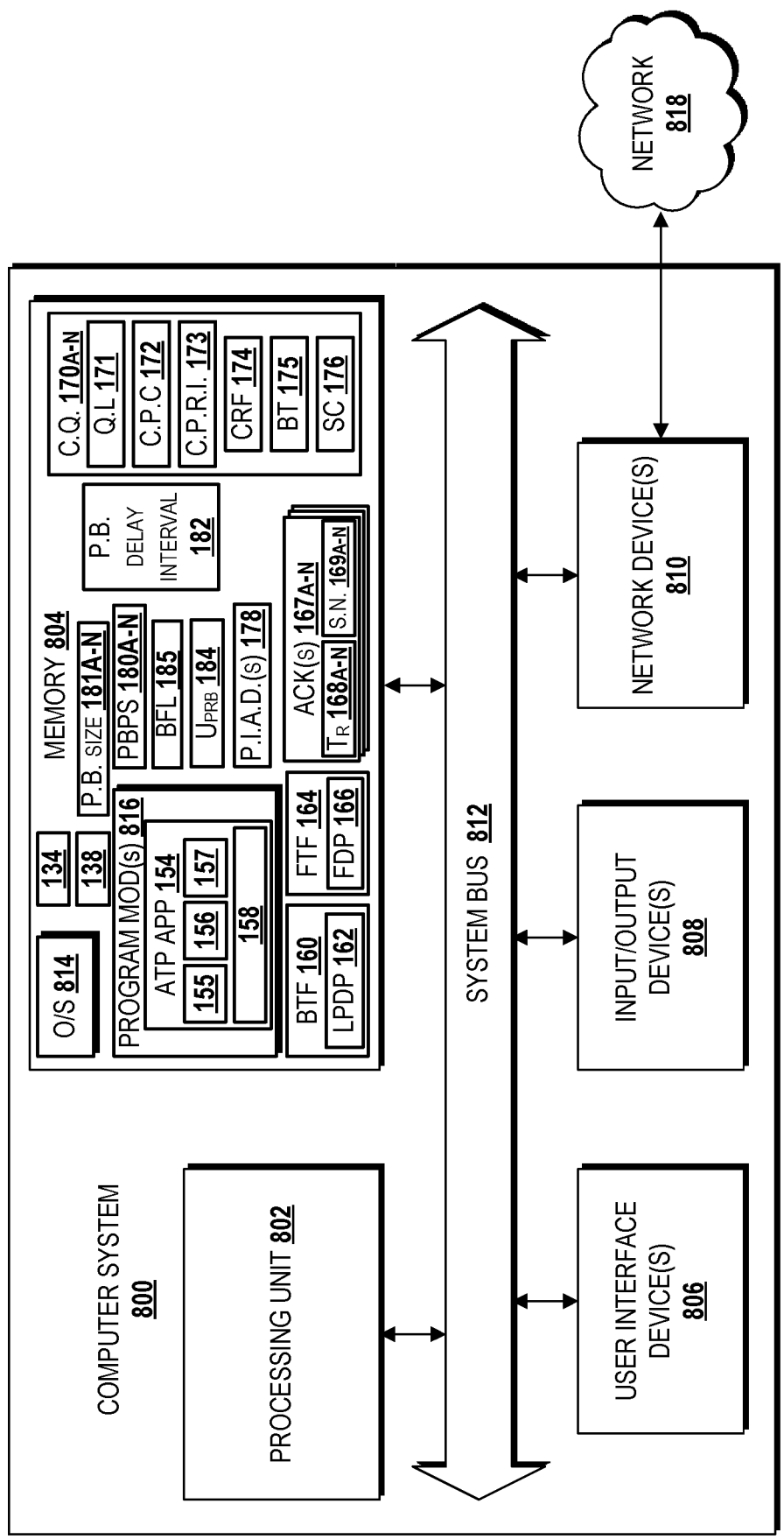
FIG. 8 is a block diagram illustrating an example computer system capable of implementing aspects of the embodiments presented and described herein.

Turning now to FIG. 8, a block diagram is provided illustrating a computer system 800 configured to provide the functionality in accordance with various embodiments of the concepts and technologies disclosed herein. The systems, devices, and other components disclosed herein can utilize, at least in part, an architecture that is the same as or at least similar to the architecture of the computer system 800. In some embodiments, one or more of foreground source server 132, the background source server 136, the transport host platform 142, the proxy server 150, the cell site 112, and/or the client device 102A-N, can be configured as an instance of the computer system 800. It should be understood, however, that modification to the architecture may be made to facilitate performance of operations and certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can include one or more central processing units ("CPUs") configured with one or more processing cores, and/or one or more graphics processing unit ("GPU") configured to accelerate operations performed by one or more CPUs. The processing unit 802 can include one or more system-on-chip ("SoC") components along with one or more other components, including, for example, one or more of the memory resources, and/or one or more of the other resources. Processing units are understood by one of ordinary skill in the technology, and therefore are not described in further detail herein. In some embodiments, the processing unit 802 can provide one or more instances of the processor 151. Additionally, one or more instances of the processing unit 802 can be implemented within any of the devices and/or elements discussed in FIG. 1, such as but not limited to the foreground source server 132, the background source server 136, the transport host platform 142, the network 130, the core network 140, the proxy server 150, the RAN 110, the cell site 112, and/or the client devices 102A-N. As such, one or more instances of the processing unit 802 can provide or otherwise support the core network 140, the RAN 110, and/or the network 130. It is understood that the processor 151 of the proxy server 150 can be implemented as one or more instances of processing unit 802.

The memory 804 communicates with the processing unit 802 via the system bus 812. In various embodiments, the memory 152 can be implemented as an instance of the memory 804. In some embodiments, the memory 804 is operatively connected to a memory controller (not shown) that enables communication with the processing unit 802 via the system bus 812. The illustrated memory 804 includes an operating system 814 and one or more program modules 816. It is understood that the term "module" is to refer to a distinct set of computer-readable instructions (e.g., an application or other software) that, upon execution by a processing unit, transform the processing unit and/or device so as to provide a non-generic machine, such as the computer system 800. As such, The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. In some embodiments, for example, the program modules 816 can include the proportional fair scheduler 114, the ATP application 154, the flow aware script 155, the GAP script$_1$ 156, the GAP script$_2$ 157, and/or the GAP script$_3$ 158, the background flow limiter 185, and/or other program modules. These and/or other programs can be embodied in a computer storage medium storing instructions that, when executed by the processing unit 802, in some embodiments, may perform and/or facilitate performance of one or more of the operations discussed with respect to FIGS. 1, 2, 3A, 3B, 4A, 4B, and 4C described in detail above. According to some embodiments, the program modules 816 may be embodied in hardware, software, firmware, or any combination thereof. In some embodiments, the memory 804 also can be configured to store data including, but not limited to, the background traffic flow 160, the low priority data packets 162, the foreground traffic flow 164, the foreground data packet 166, the ACKs 167A-N, the client queue 170A-N, the probe burst packet sets 180A-N, the probe burst sizes 181A-N, the probe burst delay interval 182, the $U_{PRB}$ indicator 184 (i.e., PRB utilization), the foreground content package 134, the background content package 138, the queue length indicator 171, the communication path capacity indicator 172, the communication path rate indicator 173, the capacity reserve factor 174, the busyness threshold factor 175, the spare capacity indicator 176, the packet inter-arrival discontinuity 178, the received timestamps 168A-N, the sequence numbers 169A-N, any other data discussed with respect to FIGS. 1, 2, 3A, 3B, and/or other data, if desired.

By way of example, and not limitation, computer-readable media may include any available communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrases "memory", "computer storage medium", and variations thereof, does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer. In some embodiments, the I/O devices 808 can be used for manual controls for operations to exercise under certain emergency situations.

The network devices 810 enable the computer system 800 to communicate with other networks or remote systems via a network 818, such as the network 102 and/or the network 600. Examples of the network devices 810 include, but are not limited to, a modem, a radio frequency ("RF") or infrared ("IR") transceiver, a telephonic interface, a bridge, a router, or a network card. The network devices 810 may support communication and functionality with the network 818, such as via physical network functions, virtual network functions, virtual and/or physical edge devices, or the like. The network devices 810 can, in some embodiments, be included in the core network 140 and/or the RAN 110, such as via the cell site 112, the proxy server 150, and/or the transport host platform 142. The network 818 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 818 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, a cellular network (e.g., a radio access network), or any other mobile network and/or wireline network.

Figure 9:
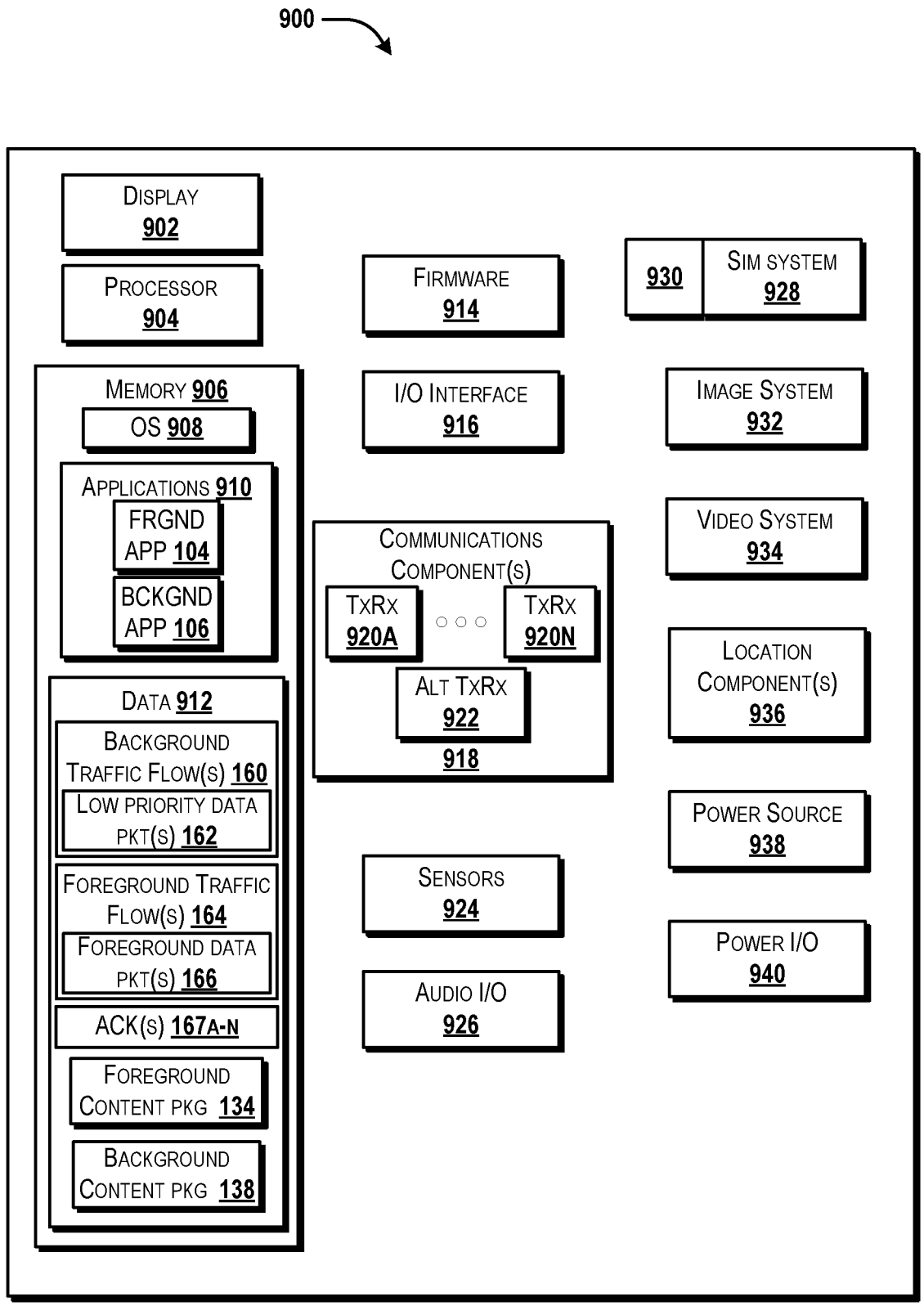
FIG. 9 is a block diagram illustrating an example user equipment capable implementing aspects of the embodiments presented and described herein.

Turning now to FIG. 9, an illustrative user equipment 900 and components thereof will be described. In some embodiments, instances of the client devices 102A-N and/or other devices illustrated and described herein can be configured as and/or can have an architecture similar or identical to the user equipment 900 described herein in FIG. 9. In some embodiments, an instance of the user equipment 900 can be associated with a user of the client devices 102A-N, such as any of the users 101A-N. It should be understood, however, that the various devices illustrated and described herein may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the user equipment 900 can include a display 902 for presenting data and information. According to various embodiments, the display 902 can be configured to present various graphical user interface ("GUI") elements for presenting and/or modifying information associated with audiovisual content, an media content data stream, presenting text, images, video, virtual keypads and/or keyboards, messaging data, notification messages, metadata, internet content, device status, time, date, calendar data, device preferences, map and location data, combinations thereof, and/or the like. The user equipment 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the foreground application 104, the background application 106, and/or a display application (not shown) that can present communications, data, and/or other computer-executable instructions stored in a memory 906, and/or received by the user equipment 900. In some embodiments, the applications 910 also can include a user interface application (not illustrated in FIG. 9).

The UI application can interface with the operating system 908 to facilitate any of the operations discussed herein and functionality for presenting audiovisual content and/or data stored at the user equipment 900 and/or stored elsewhere. It is understood that one or more instances of the operating system 908 may be included and operate within one or more systems discussed with respect to the operating environment 100, such as but not limited to the client devices 102A-N. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

In various embodiments, applications such as one or more of the foreground application 104 and/or the background application 106, can be executed by the processor 904 to aid a user in presenting content, obtaining network access to use the network communication services, providing feedback, obtaining data from a server (e.g., the foreground content package 134 from the foreground source server 132 and/or the background content package 138 from the background source server 136), configuring settings, manipulating address book content and/or settings, multimode interaction, interacting with other applications 910, and otherwise facilitating user interaction with the operating system 908, the applications 910, and/or other types or instances of data 912 that can be stored at the user equipment 900, such as stored by the memory 906. According to various embodiments, the data 912 can include, for example, instances of background traffic flow 160, the low priority data packet 162, the foreground traffic flow 164, the foreground data packet 166, the ACKs 167A-N, the foreground content package 134, the background content package 138, any other elements discussed with respect to FIG. 1 and FIG. 2, presence applications, visual voice mail applications, messaging applications, text-to-speech and speech-to-text applications, add-ons, plug-ins, email applications, music and/or streaming applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The user equipment 900 also can include an input/output ("I/O") interface 916. One or more instances of the I/O interface 916 can be included any computer system and/or device discussed in FIG. 1 (e.g., the client devices 102A-N, the proxy server 150, the foreground source server 132, the background source server 136, the transport host platform 142, the cell site 122, etc.). The I/O interface 916 can be configured to support the input/output of data such as a communication and/or message sent to and/or from the client devices 102A-N, and/or any other information or elements discussed with respect to FIGS. 1, 2, 3A, 3B, 4A, 4B, and 4C, user information, organization information, presence status information, user IDs, passwords, and application initiation (start-up) requests or other data sent via the operating environment 100. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, industry standard port, combinations thereof, or the like. In some embodiments, the user equipment 900 can be configured to synchronize with another device to transfer content to and/or from the user equipment 900. In some embodiments, the user equipment 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the user equipment 900 and a network device or local device.

The user equipment 900 also can include a communications component 918. The communications component 918 can be configured to interface with the processor 904 to facilitate wired and/or wireless communications with one or more networks such as the RAN 110, the core network 140, and/or the network 130 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks. The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 3G, 4G, LTE, LTE Advanced, 5G, New Radio, and greater or future generation technology standards. Moreover, the communications component 918 may facilitate communications over various channel access methods (which may or may not be used by the aforementioned standards) including, but not limited to, TDMA, FDMA, W-CDMA, OFDMA, SDMA, carrier aggregation, and the like.

In addition, the communications component 918 may facilitate data communications using GPRS, EDGE, the HSPA protocol family including HSDPA, EUL or otherwise termed HSDPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 918 can support one or more communication modes discussed with respect to FIG. 3B.

The user equipment 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the user equipment 900 may be provided by an audio I/O component 926. The audio I/O component 926 of the user equipment 900 can include one or more speakers for the output of audio signals, one or more microphones for the collection and/or input of audio signals, and/or other audio input and/or output devices. In some embodiments, the audio I/O component 926 may be included as a component of the display 902. For example, in some embodiments, the display 902 can provide and present visual images and/or audio input and/or audio output. In some embodiments, the I/O interface 916 can include direct communicative coupling with the display 902 and/or the audio I/O component 926 so as to provide transfer and input and/or output of visual images (e.g., from the display 902) and/or audio clips (e.g., from the audio I/O component 926) to and/or from the user equipment 900.

The illustrated user equipment 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the user equipment 900 are contemplated, it should be understood that these embodiments are illustrative, and should not be construed as being limiting in any way.

The user equipment 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The user equipment 900 may also include a video system 934. The video system 934 can be configured to capture, process, record, modify, and/or store video content. Photos and videos obtained using the image system 932 and the video system 934, respectively, may be added as message content to an MMS message, email message, and sent to another user equipment. The video and/or photo content also can be shared with other devices via various types of data transfers via wired and/or wireless user equipment as described herein.

The user equipment 900 also can include one or more location components 936. The location components 936 can be configured to send and/or receive signals to determine a geographic location of the user equipment 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the user equipment 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the user equipment 900. Using the location component 936, the user equipment 900 can generate and/or receive data to identify its geographic location, or to transmit data used by other devices to determine the location of the user equipment 900. The location component 936 may include multiple components for determining the location and/or orientation of the user equipment 900.

The illustrated user equipment 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the user equipment 900 can include additional and/or alternative components, the above embodiment should be understood as being illustrative of one possible operating environment for various embodiments of the concepts and technologies described herein. The described embodiment of the user equipment 900 is illustrative, and therefore should not be construed as being limiting in any way.

Based on the foregoing, it should be appreciated that concepts and technologies directed to agile transport for background traffic in cellular networks have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, operations, or mediums described herein. Rather, the specific features, operations, and mediums are disclosed as example forms of implementing the concepts and technologies disclosed herein. The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, in response to execution by the processor, cause the processor to perform operations comprising:
  determining a capacity of a communication path that communicatively couples a user equipment to a radio access network cell site,
  assembling a plurality of probe burst packet sets from a background traffic flow, wherein the plurality of probe burst packet sets comprise a first probe burst packet set, a second probe burst packet set, and a third probe burst packet set,
  probing the communication path for spare capacity using the plurality of probe burst packet sets, wherein probing the communication path for spare capacity comprises
    delivering, via the communication path, the first probe burst packet set to the user equipment,
    determining that the communication path is not busy based on a lack of a packet inter-arrival discontinuity after delivery of the first probe burst packet set,
    in response to determining that the communication path is not busy, delivering, via the communication path, the second probe burst packet set to the user equipment,
    determining that the communication path remains not busy based on a lack of a packet inter-arrival discontinuity after delivery of the second probe burst packet set,
    in response to determining that the communication path remains not busy, delivering, via the communication path, the third probe burst packet set to the user equipment, and
    determining that the communication path continues to remain not busy based on a lack of a packet inter-arrival discontinuity after delivery of the third probe burst packet set, and delivering the background traffic flow to the user equipment using the spare capacity while the communication path is not busy.

2. The system of claim 1, wherein delivery of the background traffic flow is limited such that a reserve capacity of the communication path is maintained.

3. The system of claim 1, wherein the third probe burst packet set is larger in size than the second probe burst packet set, and wherein the second probe burst packet set is larger in size than the first probe burst packet set.

4. The system of claim 1, wherein delivering the background traffic flow to the user equipment occurs in response to determining that the communication path continues to remain not busy.

5. The system of claim 1, wherein the operations further comprise detecting that bursts of a foreground traffic flow are being sent concurrently along the communication path while the background traffic flow is being delivered.

6. The system of claim 5, wherein the operations further comprise:
in response to detecting that bursts of the foreground traffic flow are being sent, determining whether the communication path is busy; and
in response to determining that the communication path is busy, yielding the capacity of the communication path to the foreground traffic flow.

7. The system of claim 5, wherein the operations further comprise:
in response to detecting that bursts of the foreground traffic flow are being sent, determining whether the communication path is busy; and
in response to determining that the communication path is not busy, continuing to deliver the background traffic flow to the user equipment using the spare capacity.

8. A method comprising:
determining, by a proxy server, a capacity of a communication path that communicatively couples a user equipment to a radio access network cell site;
assembling, by the proxy server, a plurality of probe burst packet sets from a background traffic flow, wherein the plurality of probe burst packet sets comprises a first probe burst packet set, a second probe burst packet set, and a third probe burst packet set;
probing, by the proxy server, the communication path for spare capacity using the plurality of probe burst packet sets, wherein probing the communication path for spare capacity comprises
delivering, by the proxy server, via the communication path, the first probe burst packet set to the user equipment,
determining, by the proxy server, that the communication path is not busy based on a lack of a packet inter-arrival discontinuity after delivery of the first probe burst packet set,
in response to determining that the communication path is not busy, delivering, by the proxy server, via the communication path, the second probe burst packet set to the user equipment,
determining, by the proxy server, that the communication path remains not busy based on a lack of the packet inter-arrival discontinuity after delivery of the second probe burst packet set,
in response to determining that the communication path remains not busy, delivering, by the proxy server, via the communication path, the third probe burst packet set to the user equipment, and
determining, by the proxy server, that the communication path continues to remain not busy based on a lack of the packet inter-arrival discontinuity after delivery of the third probe burst packet set; and
delivering, by the proxy server, the background traffic flow to the user equipment using the spare capacity while the communication path is not busy.

9. The method of claim 8, wherein delivery of the background traffic flow is limited such that a reserve capacity of the communication path is maintained.

10. The method of claim 8, wherein the third probe burst packet set is larger in size than the second probe burst packet set, and wherein the second probe burst packet set is larger in size than the first probe burst packet set.

11. The method of claim 8, wherein delivering the background traffic flow to the user equipment occurs in response to determining that the communication path continues to remain not busy.

12. The method of claim 8, further comprising detecting, by the proxy server, that bursts of a foreground traffic flow are being sent concurrently along the communication path while the background traffic flow is being delivered.

13. The method of claim 12, further comprising:
in response to detecting that bursts of the foreground traffic flow are being sent, determining, by the proxy server, whether the communication path is busy; and
in response to determining that the communication path is busy, yielding, by the proxy server, the capacity of the communication path to the foreground traffic flow.

14. The method of claim 12, further comprising:
in response to detecting that bursts of the foreground traffic flow are being sent, determining, by the proxy server, whether the communication path is busy; and
in response to determining that the communication path is not busy, continuing to deliver, by the proxy server, the background traffic flow to the user equipment using the spare capacity.

15. A computer storage medium having computer-executable instructions stored thereon that, in response to execution by a processor, cause the processor to perform operations comprising:
determining a capacity of a communication path that communicatively couples a user equipment to a radio access network cell site;
assembling a plurality of probe burst packet sets from a background traffic flow, wherein the plurality of probe burst packet sets comprises a first probe burst packet set, a second probe burst packet set, and a third probe burst packet set;
probing the communication path for spare capacity using the plurality of probe burst packet sets, wherein probing the communication path for spare capacity comprises
delivering, via the communication path, the first probe burst packet set to the user equipment,
determining that the communication path is not busy based on a lack of a packet inter-arrival discontinuity after delivery of the first probe burst packet set,
in response to determining that the communication path is not busy, delivering, via the communication path, the second probe burst packet set to the user equipment,
determining that the communication path remains not busy based on a lack of the packet inter-arrival discontinuity after delivery of the second probe burst packet set, in response to determining that the communication path remains not busy, delivering, via the communication path, the third probe burst packet set to the user equipment, and determining that the communication path continues to remain not busy based on a lack of the packet inter-arrival discontinuity after delivery of the third probe burst packet set; and delivering the background traffic flow to the user equipment using the spare capacity while the communication path is not busy.

16. The computer storage medium of claim 15, wherein delivery of the background traffic flow is limited such that a reserve capacity of the communication path is maintained.

17. The computer storage medium of claim 15, wherein the third probe burst packet set is larger in size than the second probe burst packet set, and wherein the second probe burst packet set is larger in size than the first probe burst packet set.

18. The computer storage medium of claim 15, wherein the operations further comprise detecting that bursts of a foreground traffic flow are being sent concurrently along the communication path while the background traffic flow is being delivered.

19. The computer storage medium of claim 18, wherein the operations further comprise:

in response to detecting that bursts of the foreground traffic flow are being sent, determining whether the communication path is busy; and in response to determining that the communication path is busy, yielding the capacity of the communication path to the foreground traffic flow.

20. The computer storage medium of claim 18, wherein the operations further comprise:

in response to detecting that bursts of the foreground traffic flow are being sent, determining whether the communication path is busy; and in response to determining that the communication path is not busy, continuing to deliver the background traffic flow to the user equipment using the spare capacity.

* * * * *